United States Patent
Noguchi et al.

(10) Patent No.: US 9,323,374 B2
(45) Date of Patent: Apr. 26, 2016

(54) DISPLAY, TOUCH DETECTION UNIT, DRIVING METHOD, AND ELECTRONIC UNIT

(71) Applicant: Japan Display West Inc., Aichi-ken (JP)

(72) Inventors: Koji Noguchi, Kanagawa (JP);
Yoshitoshi Kida, Kanagawa (JP);
Hiroshi Mizuhashi, Kanagawa (JP);
Kohei Azumi, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 503 days.

(21) Appl. No.: 13/624,297

(22) Filed: Sep. 21, 2012

(65) Prior Publication Data
US 2013/0082977 A1  Apr. 4, 2013

(30) Foreign Application Priority Data

Sep. 29, 2011 (JP) ................................. 2011-214869

(51) Int. Cl.
*G06F 3/044* (2006.01)
*G06F 3/041* (2006.01)

(52) U.S. Cl.
CPC .............. *G06F 3/0412* (2013.01); *G06F 3/044* (2013.01)

(58) Field of Classification Search
CPC ................. G09G 2310/02; G09G 2310/0202; G09G 2310/0213; G09G 2310/0216; G09G 2310/0221; G06F 3/0412; G06F 3/0416; G06F 3/0418; G06F 3/041; G06F 3/044; G02F 1/13338
See application file for complete search history.

(56) References Cited

U.S. PATENT DOCUMENTS

| 2008/0158180 A1* | 7/2008 | Krah ................... G06F 3/03545 345/173 |
| 2010/0328239 A1* | 12/2010 | Harada ................. G06F 3/0412 345/173 |
| 2011/0210939 A1* | 9/2011 | Reynolds .............. G06F 3/0418 345/174 |

FOREIGN PATENT DOCUMENTS

| JP | 2009-244958 | 10/2009 |
| JP | 2013-521548 | 6/2013 |
| WO | WO 2011/106575 A2 | 9/2011 |

OTHER PUBLICATIONS

Japanese Office Action issued in connection related Japanese patent application No. JP 2011-214869 dated Jun. 3, 2014.

* cited by examiner

*Primary Examiner* — Grant Sitta
*Assistant Examiner* — Amen Bogale
(74) *Attorney, Agent, or Firm* — Dentons US LLP

(57) ABSTRACT

A display includes: display elements; drive electrodes; touch detection electrodes each forming an electrostatic capacitance with corresponding one of the drive electrodes; and a drive section applying an AC drive signal to the drive electrodes during each of a plurality of touch detection periods, the AC drive signal involving multiple transition to generate one or more transition timing pairs. The AC drive signal includes at least a first transition timing pair and a second transition timing pair over the plurality of touch detection periods. The first transition timing pair has a first transition interval, and the second transition timing pair has a second transition interval different from the first transition interval.

18 Claims, 19 Drawing Sheets

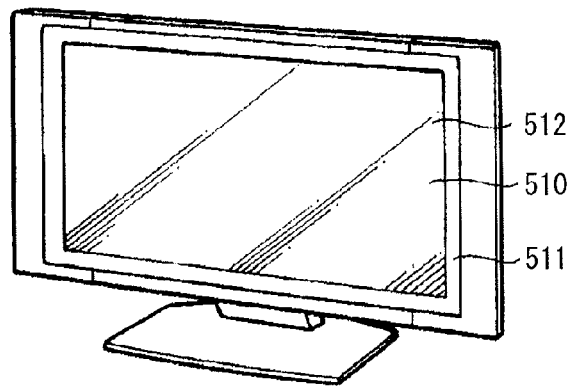
FIG. 20
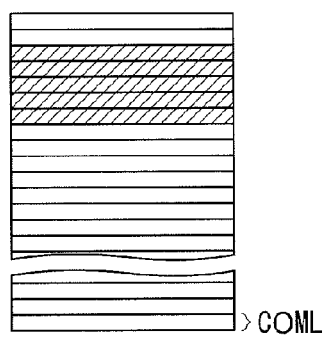
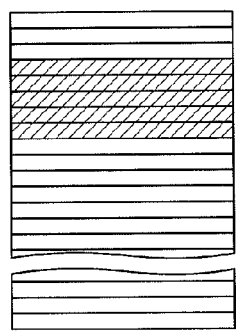
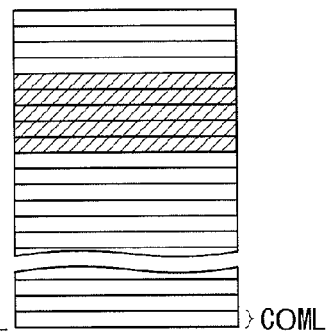
FIG. 21A    FIG. 21B    FIG. 21C

DISPLAY, TOUCH DETECTION UNIT, DRIVING METHOD, AND ELECTRONIC UNIT

BACKGROUND

This disclosure relates to a display with a touch detection function, a touch detection unit, a method of driving the touch detection unit, and an electronic unit having the display with a touch detection function.

In recent years, a display capable of inputting information by mounting a contact detection device, which is a so-called touch panel, on a display panel of a liquid crystal display and the like, or integrating the touch panel and the display panel, and displaying various button images and the like on the display panel instead of typical mechanical buttons has attracted attention. The display including such a touch panel does not demand input devices such as a keyboard, a mouse, and a keypad, and therefore there is a tendency to expand the use of such a display to portable information terminals such as mobile phones, in addition to computers.

As a method used in a touch panel, some methods such as optical method and a resistance method exist, and an electrostatic capacitance type touch panel is expected to be developed which has a relatively simple configuration and is capable of achieving low power consumption. For example, in Japanese Unexamined Patent Application Publication No. 2009-244958, a display with a touch detection function of so-called in-cell type has been proposed in which a common electrode for display arranged originally in a display panel is also used as one electrode of a pair of touch sensor electrodes, and the other electrode (touch detection electrode) is arranged to intersect with the common electrode. In addition, a display with a touch detection function of so-called on-cell type in which a touch panel is formed on a display surface of a display panel has been somewhat proposed.

SUMMARY

Incidentally, if a noise is applied to a touch panel, a touch detection operation may operate erroneously. In particular, in a touch panel of an electrostatic capacitance type, noise (disturbance noise) caused by an inverter fluorescent lamp, an AM wave, an AC power source, and the like may propagate to the touch panel, resulting in malfunction. Accordingly, a touch panel capable of reducing probability of malfunction caused by noise has been demanded.

It is desirable to provide a display, a touch detection unit, a driving method, and an electronic unit which are allowed to reduce probability of malfunction caused by noise.

According to an embodiment of the disclosure, there is provided a display including display elements; drive electrodes; touch detection electrodes each forming an electrostatic capacitance with corresponding one of the drive electrodes; and a drive section applying an AC drive signal to the drive electrodes during each of a plurality of touch detection periods, the AC drive signal involving multiple transition to generate one or more transition timing pairs. The AC drive signal includes at least a first transition timing pair and a second transition timing pair over the plurality of touch detection periods. The first transition timing pair has a first transition interval, and the second transition timing pair has a second transition interval different from the first transition interval.

According to an embodiment of the disclosure, there is provided a touch detection unit including drive electrodes; touch detection electrodes each forming an electrostatic capacitance with corresponding one of the drive electrodes; and a drive section applying an AC drive signal to the drive electrodes during each of a plurality of touch detection periods, the AC drive signal involving multiple transition to generate one or more transition timing pairs. The AC drive signal includes at least a first transition timing pair and a second transition timing pair over the plurality of touch detection periods. The first transition timing pair has a first transition interval, and the second transition timing pair has a second transition interval different from the first transition interval.

According to an embodiment of the disclosure, there is provided a driving method including: generating an AC drive signal that involves multiple transition to generate one or more transition timing pairs; and applying the AC drive signal to drive electrodes during each of a plurality of touch detection periods, the drive electrode forming an electrostatic capacitance with touch detection electrodes. The AC drive signal includes at least a first transition timing pair and a second transition timing pair over the plurality of touch detection periods. The first transition timing pair has a first transition interval, and the second transition timing pair has a second transition interval different from the first transition interval.

According to an embodiment of the disclosure, there is provided an electronic unit including a display and a control section controlling operation using the display. The display includes: display elements; drive electrodes; touch detection electrodes each forming an electrostatic capacitance with corresponding one of the drive electrodes; and a drive section applying an AC drive signal to the drive electrodes during each of a plurality of touch detection periods, the AC drive signal involving multiple transition to generate one or more transition timing pairs. The AC drive signal includes at least a first transition timing pair and a second transition timing pair over the plurality of touch detection periods. The first transition timing pair has a first transition interval, and the second transition timing pair has a second transition interval different from the first transition interval. The electronic unit according to the embodiment of the disclosure corresponds to a television, a digital camera, a personal computer, a video camera, or a mobile terminal device such as a mobile phone.

In the display, the touch detection unit, the driving method, and the electronic unit according to the embodiments of the disclosure, the AC drive signal applied to the drive electrodes during the touch detection periods is transmitted to the touch detection electrodes through the electrostatic capacitance, and then the touch detection is performed based on the AC drive signal. At this time, the AC drive signal includes, over the plurality of touch detection periods, the first transition timing pair and the second transition timing pair which have a transition interval different from each other.

In the display, the touch detection unit, the driving method, and the electronic unit according to the embodiments of the disclosure, the AC drive signal is configured to include the first transition timing pair and the second transition timing pair which have the transition interval different from each other, during one or more touch detection periods. Therefore, the possibility of malfunction caused by noise is allowed to be reduced.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIG. 20 is a perspective view illustrating an appearance configuration of an application example 1 out of display panels to which any of the embodiments is applied.

FIGS. 21A to 21C are schematic diagrams illustrating an example of touch detection scanning in a display panel according to a modification.

DETAILED DESCRIPTION

Hereinafter, preferred embodiments of the disclosure will be described in detail with reference to drawings. Note that descriptions will be given in the following order.
1. Basic principle of electrostatic capacitance type touch detection
2. First embodiment
3. Second embodiment
4. Third embodiment
5. Application example

[1. Basic Principle of Electrostatic Capacitance Type Touch Detection]

First, a basic principle of touch detection in a display panel according to embodiments of the disclosure is described with reference to FIG. 1 to FIG. 3. The touch detection method is embodied as an electrostatic capacitance type touch sensor, and a capacitor is configured with use of a pair of electrodes (a drive electrode E1 and a touch detection electrode E2) facing to each other with a dielectric body D in between as illustrated in (A) of FIG. 1. The configuration is represented as an equivalent circuit illustrated in (B) of FIG. 1. A capacitor C1 is configured of the drive electrode E1, the touch detection electrode E2, and the dielectric body D. A first end of the capacitor C1 is connected to an AC signal source (a drive signal source) S, and a second end P is grounded through a resistor R and is connected to a voltage detector (a touch detection circuit) DET. When an AC rectangular wave Sg ((B) of FIG. 3) with a predetermined frequency (for example, about several kHz to about several tens kHz) is applied to the drive electrode E1 (the first end of the capacitor C1) from the AC signal source S, an output waveform (a touch detection signal Vdet) illustrated in (A) of FIG. 3 appears in the touch detection electrode E2 (the second end P of the capacitor C1). Note that the AC rectangular wave Sg corresponds to an AC drive signal VcomAC described later.

Figure 1:
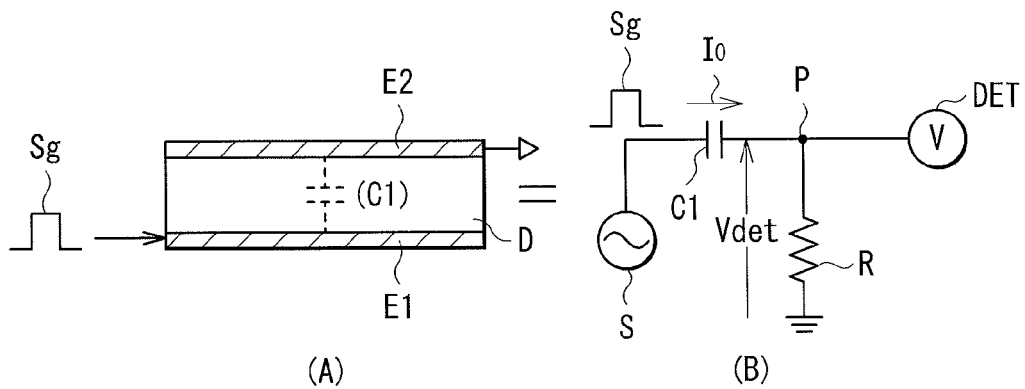
FIG. 1 is a diagram for explaining a basic principle of a touch detection method in a display panel according to embodiments of the disclosure, and a diagram illustrating a state where a finger is not in contact with or not in proximity to the display panel.

In a state where a finger is not in contact with (or not in proximity to) the display panel, as illustrated in FIG. 1, a current I0 according to the capacitance value of the capacitor C1 flows in response to charge and discharge with respect to the capacitor C1. The second end P of the capacitor C1 at this time has a potential waveform like a waveform V0 in (A) of FIG. 3, and the waveform is detected by the voltage detector DET.

Figure 2:
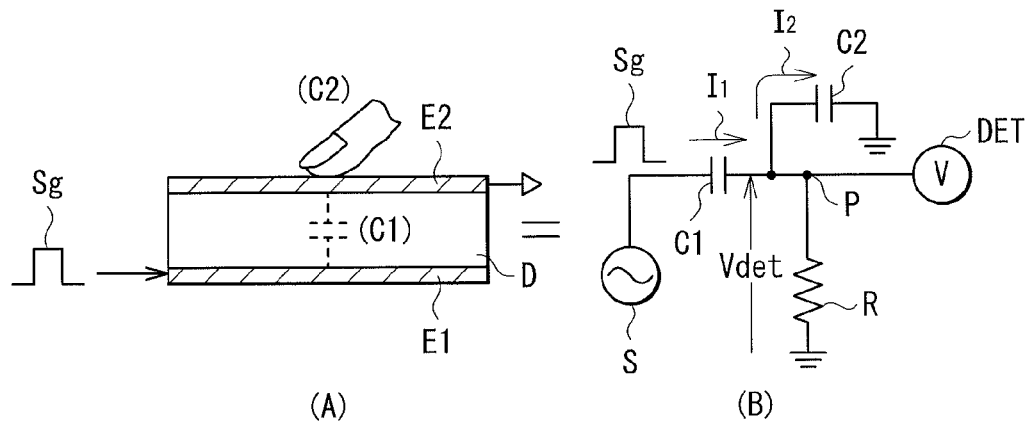
FIG. 2 is a diagram for explaining the basic principle of the touch detection method in the display panel according to the embodiments of the disclosure, and a diagram illustrating a state where a finger is in contact with or in proximity to the display panel.
Figure 3:
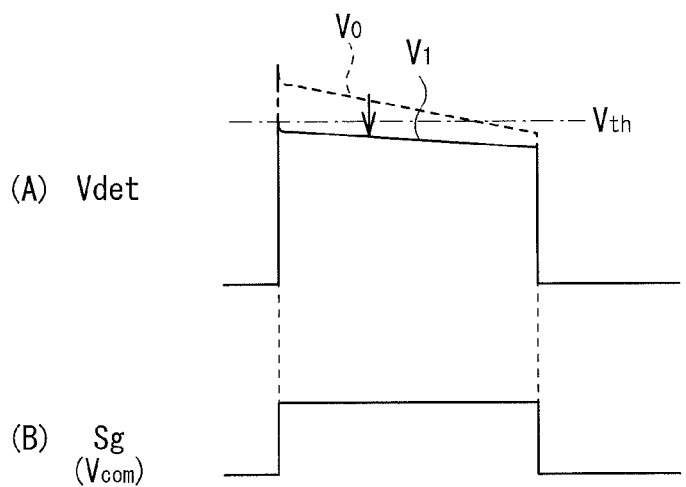
FIG. 3 is a diagram for explaining the basic principle of the touch detection method in the display panel according to the embodiments of the disclosure, and a diagram illustrating an example of a waveform of a drive signal and a touch detection signal.

On the other hand, in a state where a finger is in contact with (or in proximity to) the display panel, as illustrated in FIG. 2, a capacitor C2 formed by the finger is added in series with the capacitor C1. In this state, currents I1 and I2 flow in response to charge and discharge with respect to the capacitors C1 and C2, respectively. The second end P of the capacitor C1 has a potential waveform like a waveform V1 in (A) of FIG. 3, and the waveform is detected by the voltage detector DET. At this time, the potential of the point P is a partial potential determined by values of the currents I1 and I2 flowing through the capacitors C1 and C2. Therefore, the waveform V1 is a smaller value than that of the waveform V0 in a non-contact state. The voltage detector DET compares the detected voltage with a predetermined threshold voltage Vth to determine the non-contact state when the detected voltage is equal to or larger than the threshold voltage, and to determine a contact state when the detected voltage is smaller than the threshold voltage. In such a way, touch detection is achievable.

[2. First Embodiment]
[Configuration Example]
(General Configuration Example)

Figure 4:
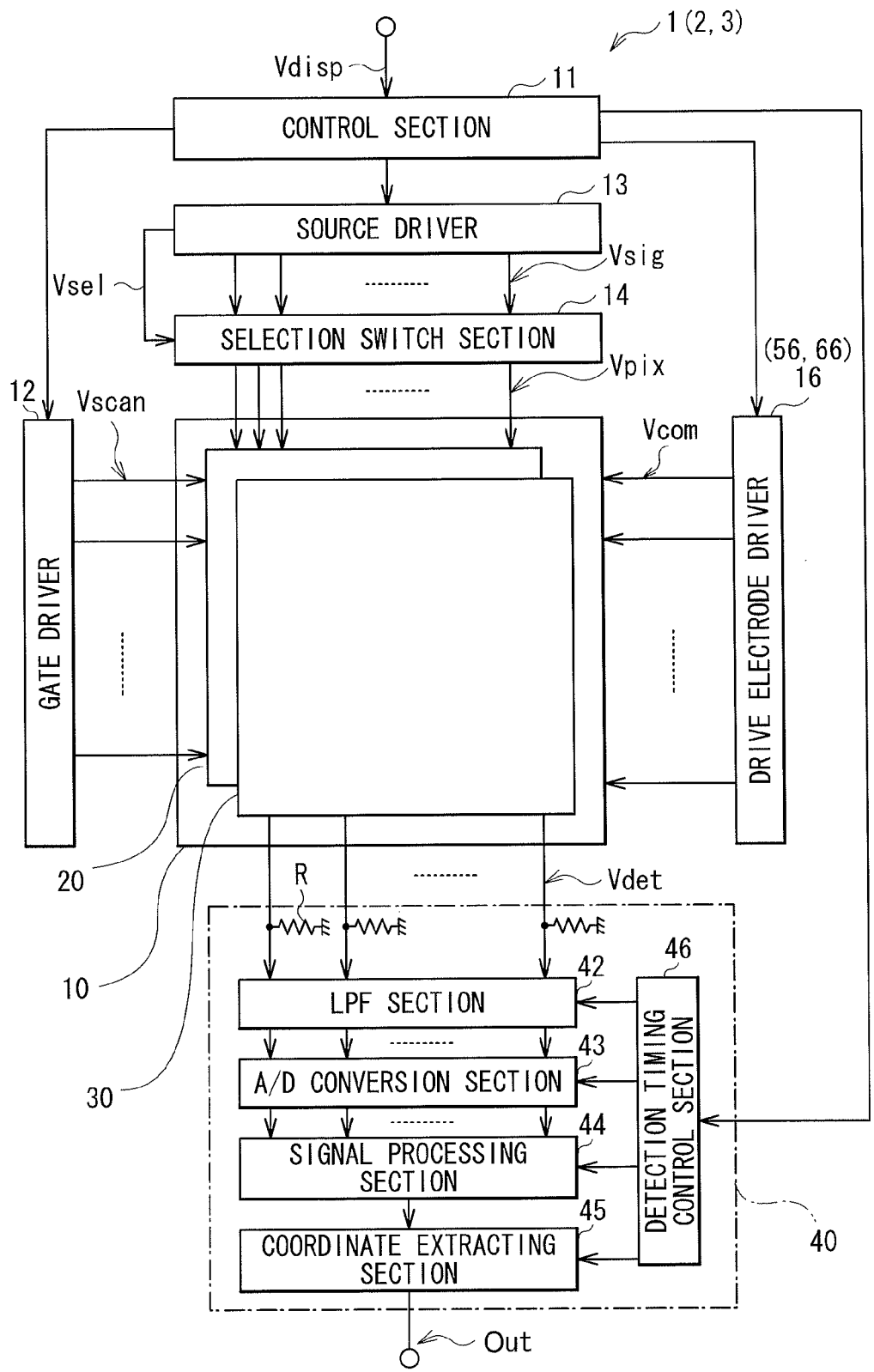
FIG. 4 is a block diagram illustrating a configuration example of a display panel according to the embodiments of the disclosure.

FIG. 4 illustrates a configuration example of a display panel 1 according to a first embodiment of the disclosure. The display panel 1 is of a so-called in-cell type in which a liquid crystal display panel and an electrostatic capacitance type touch panel are integrated.

The display panel 1 includes a control section 11, a gate driver 12, a source driver 13, a selection switch section 14, a drive electrode driver 16, a display device with a touch detection function 10, and a touch detection section 40.

The control section 11 is a circuit supplying a control signal to each of the gate driver 12, the source driver 13, the drive electrode driver 16, and the touch detection section 40, based on an image signal Vdisp, and controlling these parts to operate in synchronization with one another.

The gate driver 12 has a function to sequentially select one horizontal line which is a target of display drive of the display device with a touch detection function 10, based on the control signal supplied from the control section 11. Specifically, as will be described later, the gate driver 12 applies a scan signal Vscan to a gate of a TFT element Tr of a pixel Pix through a scan signal line GCL to sequentially select, as a target of display drive, one row (one horizontal line) from the pixels Pix formed in a matrix in a liquid crystal display device 20 of the display device with a touch detection function 10.

The source driver 13 generates and outputs a pixel signal Vsig, based on the image signal and the control signal which are supplied from the control section 11. Specifically, as will be described later, the source driver 13 generates the pixel signal Vsig from an image signal for one horizontal line to supply the thus-generated pixel signal Vsig to the selection switch section 14. The pixel signal Vsig is obtained through time-division multiplexing pixel signals Vpix of a plurality of (three in this example) sub-pixels SPix in the liquid crystal display device 20 of the display device with a touch detection function 10. In addition, the source driver 13 has a function to generate switch control signals Vsel (VselR, VselG, and VselB), and to supply the switch control signals Vsel together with the pixel signal Vsig to the selection switch section 14. The switch control signals Vsel are signals necessary for separating the pixel signals Vpix multiplexed to the pixel signal Vsig. Note that the multiplexing is performed to reduce the number of wirings between the source driver 13 and the selection switch section 14.

Based on the pixel signal Vsig and the switch control signal Vsel which are supplied from the source driver 13, the selection switch section 14 separates the pixel signal Vpix which has been time-divisional multiplexed to the pixel signal Vsig, and supplies the pixel signal Vsig to the liquid crystal display device 20 of the display device with a touch detection function 10.

Figure 5:
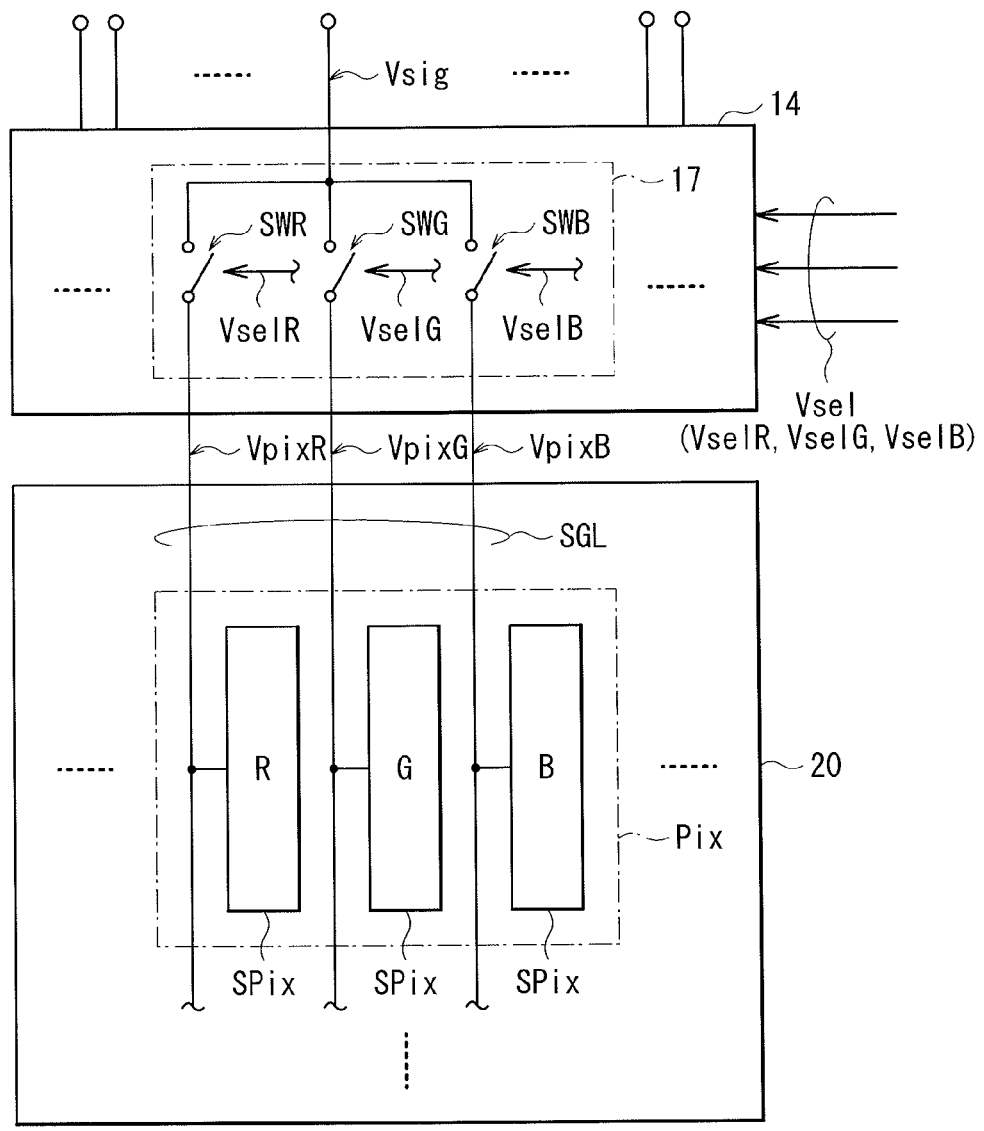
FIG. 5 is a block diagram illustrating a configuration example of a selection switch section illustrated in FIG. 4.

FIG. 5 illustrates a configuration example of the selection switch section 14. The selection switch section 14 includes a plurality of switch groups 17. Each of the switch groups 17 includes three switches SWR, SWG, and SWB in this example, and respective first ends of the switches SWR, SWG, and SWB are connected to one another and are supplied with the pixel signal Vsig from the source driver 13. Second ends of the respective switches SWR, SWG, and SWB are connected to respective three sub-pixels SPix (R, G, and B) of the pixel Pix, through the pixel signal lines SGL of the liquid crystal display device 20 of the display device with a touch detection function 10. The three switches SWR, SWG, and SWB are subjected to ON-OFF control by the switch control signals Vsel (VselR, VselG, and VselB) supplied from the source driver 13. With this configuration, the selection switch section 14 functions to separate the pixel signals Vpix (VpixR, VpixG, and VpixB) from the multiplexed pixel signal Vsig by sequentially switching the three switches SWR, SWG, and SWB to be in ON state in a time-divisional manner, in response to the switch control signals Vsel. Then, the selection switch section 14 supplies the pixel signals Vpix to the three sub-pixels SPix.

The drive electrode driver 16 is a circuit supplying a drive signal Vcom to drive electrodes COML (described later) of the display device with a touch detection function 10, based on the control signal supplied from the control section 11. Specifically, as will be described later, the drive electrode driver 16 applies a DC drive signal VcomDC to the drive electrodes COML in a display period Pd. In addition, as will be described later, the drive electrode driver 16 applies the AC drive signal VcomAC to the drive electrodes COML which are targets of touch detection operation, in a touch detection period Pt, and applies the DC drive signal VcomDC to the remaining drive electrodes COML. The AC drive signal VcomAC includes two pulses in this example. The drive electrode driver 16 drives the drive electrodes COML on a block basis (a drive electrode block B described later) configured of a predetermined number of the drive electrodes COML as will be described later.

The display device with a touch detection function 10 is a display device incorporating a touch detection function. The display device with a touch detection function 10 includes the liquid crystal display device 20 and the touch detection device 30. As will be described later, the liquid crystal display device 20 is a device performing sequential scanning on one horizontal line basis to perform display, according to the scan signal Vscan supplied from the gate driver 12. The touch detection device 30 operates based on the above-described basic principle of the electrostatic capacitance type touch detection, and outputs the touch detection signal Vdet. As will be described later, the touch detection device 30 performs sequential scanning to perform touch detection, according to the AC drive signal VcomAC supplied from the drive electrode driver 16.

The touch detection section 40 is a circuit detecting the presence of a touch event with respect to the touch detection device 30, based on the control signal supplied from the control section 11 and the touch detection signal Vdet supplied from the touch detection device 30 of the display device with a touch detection function 10, and when the touch event is detected, determining the coordinate and the like in a touch detection region. The touch detection section 40 includes a low pass filter (LPF) section 42, an A/D conversion section 43, a signal processing section 44, a coordinate extracting section 45, and a detection timing control section 46. The LPF section 42 is a low-pass filter removing a high-frequency component (noise component) contained in the touch detection signal Vdet, which is supplied from the touch detection device 30, to extract a touch component, and outputs the touch component. A resistor R for applying a DC potential (0V, for example) is connected between an input terminal of the LPF section 42 and the ground. The A/D conversion section 43 is a circuit converting an analog signal output from the LPF section 42 into a digital signal through sampling at timings in synchronization with the AC drive signal VcomAC. The signal processing section 44 is a logic circuit detecting the presence of a touch event with respect to the touch detection device 30, based on the output signal of the A/D conversion section 43. The coordinate extracting section 45 is a logic circuit determining touch panel coordinates when the touch event is detected by the signal processing section 44. The detection timing control section 46 has a function to control these circuits to operate in synchronization with one another.

(Display Device with Touch Detection Function 10)

Next, the configuration example of the display device with a touch detection function 10 will be described in detail.

Figure 6:
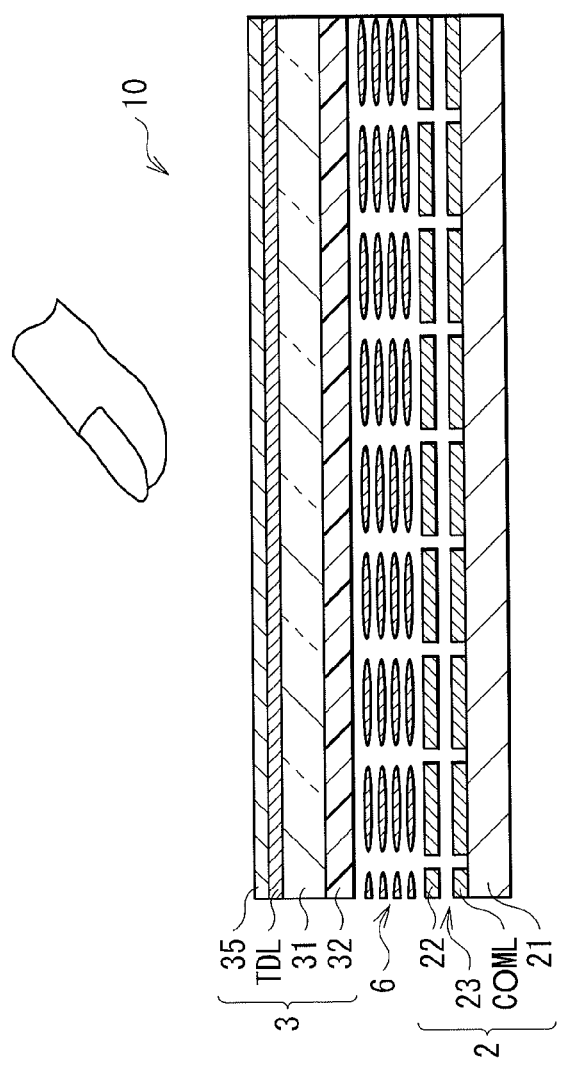
FIG. 6 is a sectional view illustrating a schematic cross-sectional configuration of a display device with a touch detection function illustrated in FIG. 4.

FIG. 6 illustrates an example of a cross-sectional configuration of a main part of the display device with a touch detection function 10. The display device with a touch detection function 10 has a pixel substrate 2, an opposed substrate 3 disposed to face the pixel substrate 2, and a liquid crystal layer 6 interposed between the pixel substrate 2 and the opposed substrate 3.

The pixel substrate 2 includes a TFT substrate 21 as a circuit substrate, the drive electrodes COML, and pixel electrodes 22. The TFT substrate 21 functions as a circuit substrate formed with various kinds of electrode, wirings, thin film transistors (TFTs), and the like. The TFT substrate may be formed of, for example, glass. On the TFT substrate 21, the drive electrodes COML are formed. The drive electrodes COML are electrodes for supplying a common voltage to a plurality of pixels Pix (described later). The drive electrodes COML function as common drive electrodes for liquid crystal display operation, and also function as drive electrodes for touch detection operation. An insulating layer 23 is formed on the drive electrodes COML, and the pixel electrodes 22 are formed on the insulating layer 23. Each of the pixel electrodes 22 is an electrode for supplying the pixel signal Vpix, and has translucency. Each of the drive electrodes COML and the pixel electrodes 22 is formed of, for example, indium tin oxide (ITO).

The opposed substrate 3 includes a glass substrate 31, a color filter 32, and touch detection electrodes TDL. The color filter 32 is formed on one surface of the glass substrate 31. The color filter is configured by, for example, cyclically arranging color filter layers of three colors of red (R), green (G), and blue (B), and a set of three colors of R, G, and B corresponds to each display pixel. The touch detection electrodes TDL are formed on the other surface of the glass substrate 31. Each of the touch detection electrodes TDL is formed of, for example, ITO, and has translucency. A polarizing plate 35 is disposed on the touch detection electrodes TDL.

The liquid crystal layer 6 functions as a display function layer, and modulates light passing therethrough according to a state of electric field. The electric field is formed by a potential difference between the voltage of the drive electrode COML and the voltage of the pixel electrode 22. Liquid crystal of lateral electric field mode such as fringe field switching (FFS) and in-plane switching (IPS) is used for the liquid crystal layer 6.

Incidentally, an alignment film is disposed between the liquid crystal layer 6 and the pixel substrate 2, and between the liquid crystal layer 6 and the opposed substrate 3. In addition, an incident-side polarizing plate is disposed on a bottom surface side of the pixel substrate 2, which is not illustrated in the figure.

Figure 7:
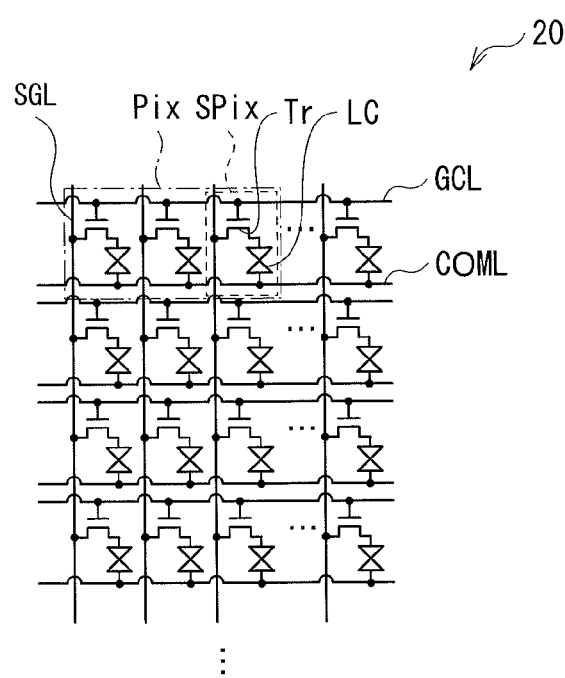
FIG. 7 is a circuit diagram illustrating a pixel arrangement in the display device with a touch detection function illustrated in FIG. 4.

FIG. 7 illustrates a configuration example of a pixel configuration in the liquid crystal display device 20. The liquid crystal display device 20 has the plurality of pixels Pix arranged in a matrix. Each of the pixels Pix is configured of three sub-pixels SPix. The three sub-pixels SPix are respectively arranged to correspond to three colors (RGB) of the color filter 32 illustrated in FIG. 6. Each of the sub-pixels SPix includes the TFT element Tr and the liquid crystal element LC. The TFT element Tr is configured of a thin film transistor, and in this example, is configured of an n-channel metal oxide semiconductor (MOS) TFT. A source of the TFT element Tr is connected to the pixel signal line SGL, a gate thereof is connected to the scan signal line GCL, and a drain thereof is connected to a first end of the liquid crystal element LC. The first end of the liquid crystal element LC is connected to the drain of the TFT element Tr, and a second end thereof is connected to the drive electrode COML.

Each of the sub-pixels SPix is connected mutually, through the scan signal line GCL, to the other sub-pixels SPix which are in the same row of the liquid crystal display device 20. The scan signal line GCL is connected to the gate driver 12, and the scan signal Vscan is supplied from the gate driver 12. In addition, one of the sub-pixels SPix is connected mutually, through the pixel signal line SGL, to the other sub-pixels SPix which are in the same column of the liquid crystal display device 20. The pixel signal line SGL is connected to the selection switch section 14, and the pixel signal Vpix is supplied from the selection switch section 14.

Moreover, each of the sub-pixels SPix is connected mutually, through the drive electrode COML, to the other sub-pixels SPix which are in the same column of the liquid crystal display device 20. The drive electrodes COML are connected to the drive electrode driver 16, and the drive signal Vcom (the DC drive signal VcomDC) is supplied from the drive electrode driver 16.

With this configuration, in the liquid crystal display device 20, the gate driver 12 drives the scan signal lines GCL to perform line-sequential scanning in a time-divisional manner so that one horizontal line is sequentially selected. Then, the source driver 13 and the selection switch section 14 supply the pixel signal Vpix to the pixels Pix in the selected horizontal line to perform display on one horizontal line basis.

Figure 8:
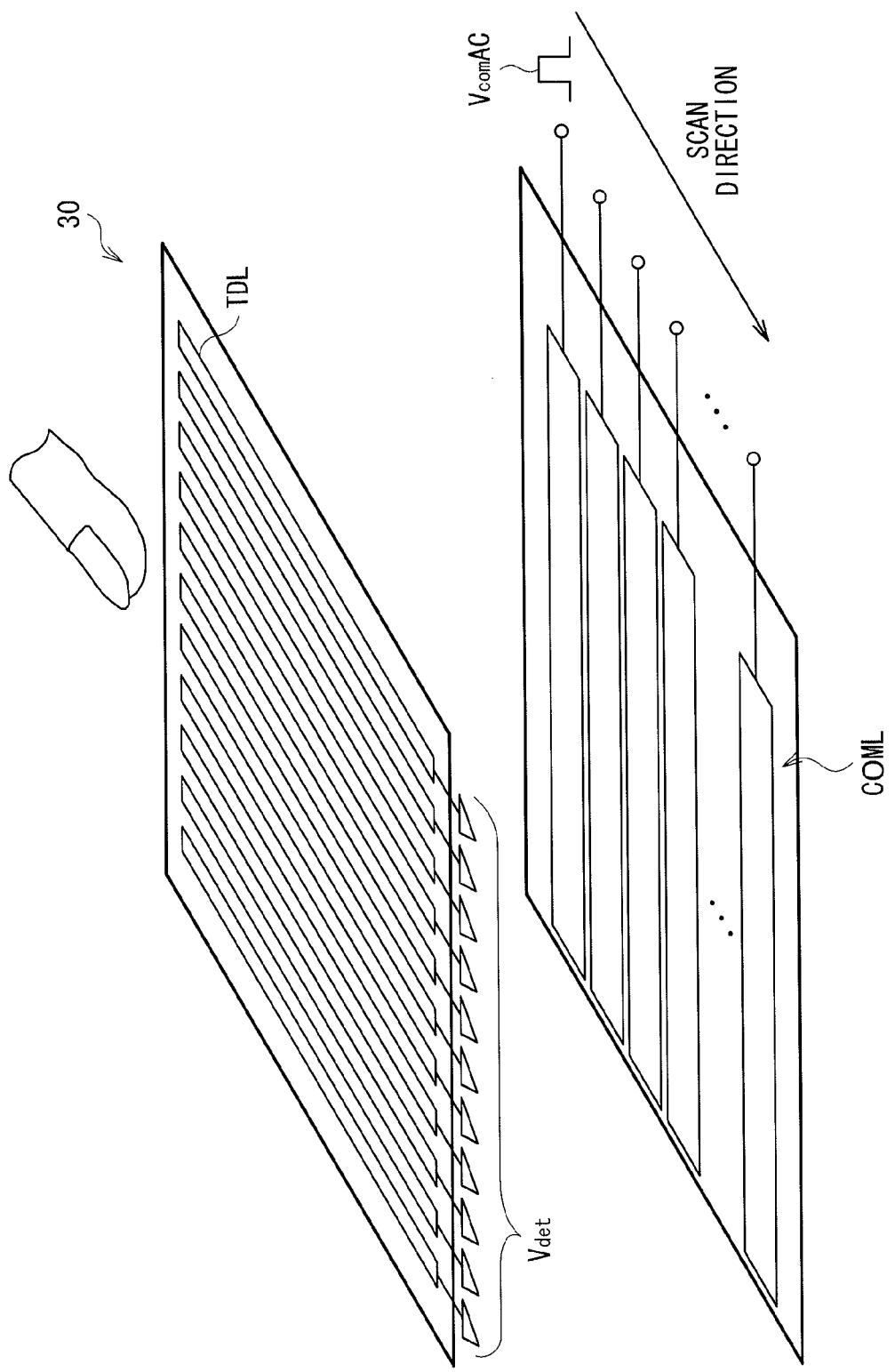
FIG. 8 is a perspective view illustrating a configuration example of drive electrodes and touch detection electrodes in the display device with a touch detection function illustrated in FIG. 4.

FIG. 8 is a perspective view illustrating a configuration example of the touch detection device 30. The touch detection device 30 is configured of the drive electrodes COML arranged in the pixel substrate 2 and the touch detection electrodes TDL arranged in the opposed substrate 3. Each of the drive electrodes COML has a strip-shaped electrode pattern extending in a lateral direction of the figure. When a touch detection operation is performed, in the each electrode pattern, the AC drive signal VcomAC is sequentially supplied to each block (drive electrode block B described later) configured of a predetermined number of drive electrodes COML, and line-sequential scan drive is performed in a time-divisional manner, as will be described later. Each of the touch detection electrodes TDL has a strip-shaped electrode pattern extending in a direction orthogonal to an extending direction of the electrode patterns of the drive electrodes COML. The electrode pattern of each of the touch detection electrodes TDL is connected to an input of the LPF section 42 of the touch detection section 40. The electrode patterns of the drive electrodes COML and the electrode patterns of the touch detection electrodes TDL intersecting with each other form an electrostatic capacitance at each intersection.

With this configuration, in the touch detection device 30, when the drive electrode driver 16 applies the AC drive signal VcomAC to the drive electrodes COML, the touch detection signal Vdet is output from the touch detection electrodes TDL, and thus the touch detection is performed. Specifically, each of the drive electrodes COML corresponds to the drive electrode E1 in the basic principle of the touch detection illustrated in FIGS. 1 to 3, each of the touch detection electrodes TDL corresponds to the touch detection electrode E2, and the touch detection device 30 detects a touch event in accordance with the basic principle. As illustrated in FIG. 8, the electrode patterns intersecting with each other configure an electrostatic capacitance type touch sensor in a matrix. Therefore, scanning is performed over the entire touch detection surface of the touch detection device 30 so that a contact position or a proximal position of the external proximity object is also detectable.

Figure 9A:
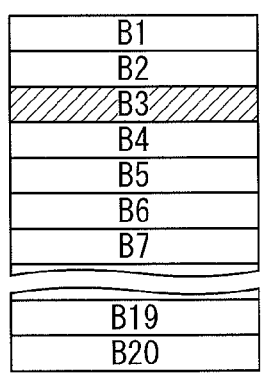
FIGS. 9A to 9C are schematic diagrams illustrating an example of touch detection scanning in a display panel illustrated in FIG. 4.
Figure 9B:
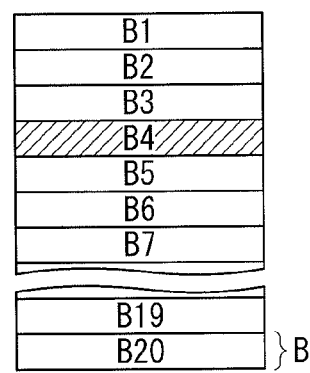
Figure 9C:
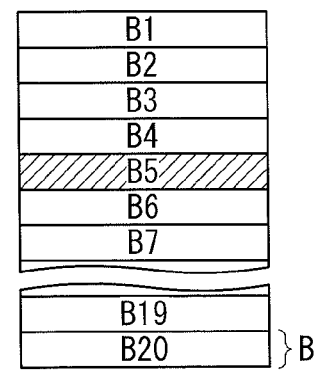

FIGS. 9A to 9C schematically illustrate the touch detection scanning. FIGS. 9A to 9C illustrate the operation in which the AC drive signal VcomAC is supplied to each of drive electrode blocks B1 to B20 in the case where the touch detection surface is configured of twenty pieces of drive electrode blocks B1 to B20. Each of the drive electrode blocks B is set to have a width (for example, about 5 mm) corresponding to a size of a finger of an operating user, for example. The drive electrode driver 16 applies the AC drive signal VcomAC to the drive electrodes COML, for each drive electrode block B. The hatched block indicates the drive electrode block B supplied with the AC drive signal VcomAC, and the other drive electrode blocks B are supplied with the DC drive signal VcomDC. As illustrated in FIGS. 9A to 9C, the drive electrode driver 16 sequentially selects the drive electrode block B to be subjected to the touch detection operation, and applies the AC drive signal VcomAC to the drive electrodes COML in the selected drive electrode block B, thereby scanning all of the drive electrode blocks B. Note that, in this example, the number of the drive electrode blocks B is set to twenty for convenience of description. However, the number of the drive electrode blocks B is not limited thereto.

[Operations and Functions]

Subsequently, operations and functions of the display panel 1 according to the first embodiment will be described.

(General Operation Outline)

With reference to FIG. 4, general operation outline of the display panel 1 is described. The control section 11 supplies the control signal to each of the gate driver 12, the source driver 13, the drive electrode driver 16, and the touch detection section 40, based on the image signal Vdisp, to control these parts to operate in synchronization with one another. The gate driver 12 supplies the scan signal Vscan to the liquid crystal display device 20 to sequentially select one horizontal line which is a target of the display drive. The source driver 13 generates the pixel signal Vsig through multiplexing the pixel signal Vpix and the switch control signal corresponding to the pixel signal Vpix, and supplies these signals to the selection switch section 14. The selection switch section 14 separates and generates the pixel signal Vpix based on the pixel signal Vsig and the switch control signal Vsel, and supplies the pixel signal Vpix to the pixels Pix configuring one horizontal line. The drive electrode driver 16 applies the DC drive signal VcomDC to all of the drive electrodes COML in the display period Pd. Moreover, the drive electrode driver 16 applies the AC drive signal VcomAC to the drive electrode COML of the drive electrode block B to be subjected to the touch detection operation, and applies the DC drive signal VcomDC to the other drive electrodes COML. The display device with a touch detection function 10 performs the display operation in the display period Pd, and performs the touch detection operation in the touch detection period Pt, thereby outputting the touch detection signal Vdet from the touch detection electrodes TDL.

The touch detection section 40 detects a touch event on the touch detection surface, based on the touch detection signal Vdet. Specifically, the LPF section 42 removes high-frequency component (noise component) contained in the touch detection signal Vdet to extract and output touch component. The A/D conversion section 43 converts the analog signal output from the LPF section 42 into a digital signal. The signal processing section 44 detects the presence of the touch event on the touch detection surface, based on the output signal of the A/D conversion section 43. The coordinate extracting section 45 determines touch panel coordinates when the touch event is detected by the signal processing section 44. The detection timing control section 46 controls the LPF section 42, the A/D conversion section 43, the signal processing section 44, and the coordinate extracting section 45 to operate in synchronization with one another.

(Detailed Operation)

Next, operations of the display panel 1 will be described in detail with reference to some drawings.

Figure 10:
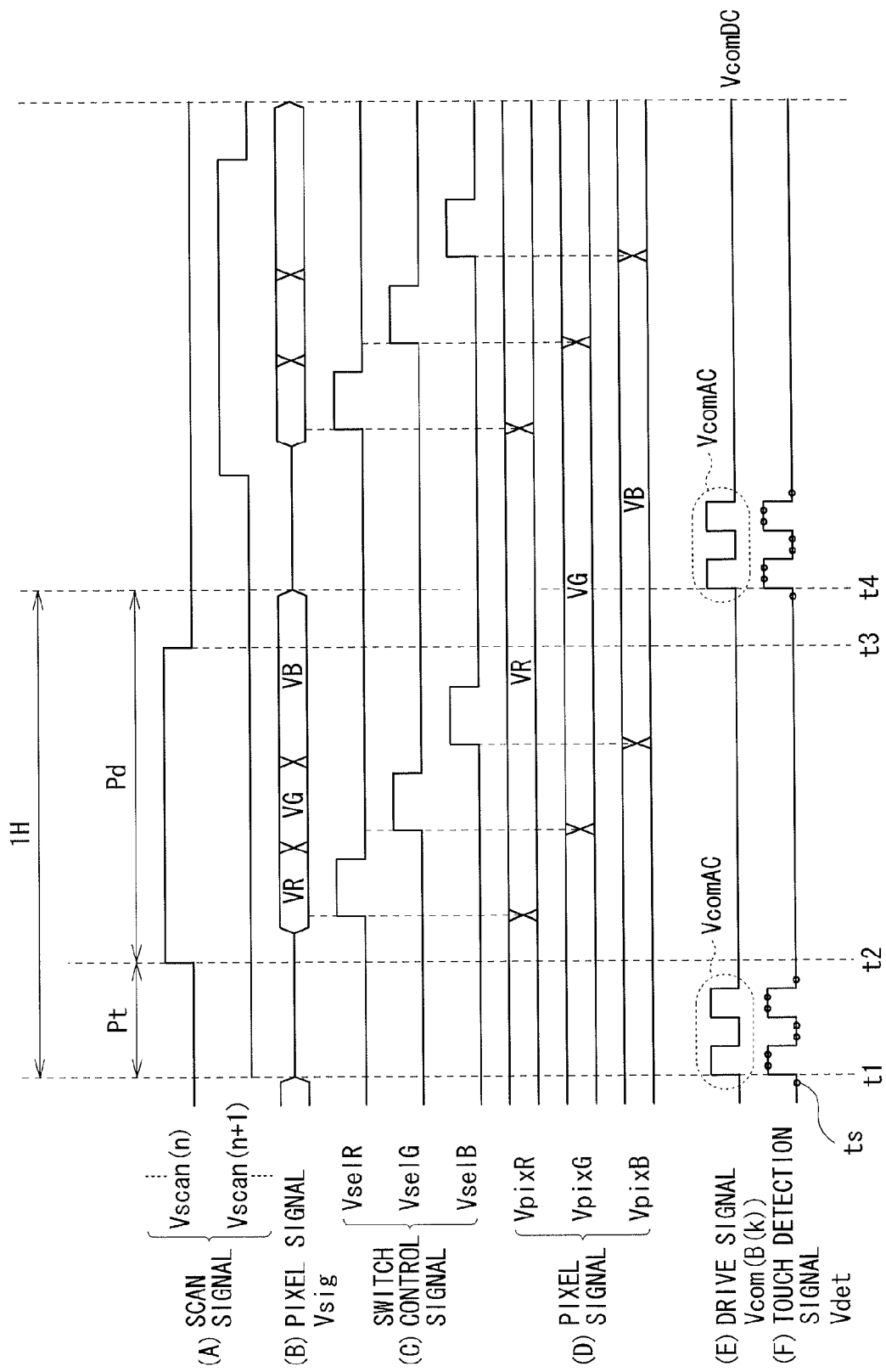
FIG. 10 is a timing chart illustrating an operation example of a display panel according to a first embodiment of the disclosure.

FIG. 10 illustrates an example of timing waveforms of the display panel 1, where (A) illustrates waveforms of the scan signal Vscan, (B) illustrates a waveform of the pixel signal Vsig, (C) illustrates waveforms of the switch control signal Vsel, (D) illustrates waveforms of the pixel signal Vpix, (E) illustrates a waveform of the drive signal Vcom, and (F) illustrates a waveform of the touch detection signal Vdet.

For the display panel 1, the touch detection period Pt during which the touch detection operation is performed and the display period Pd during which the display operation is performed are provided in one horizontal period (1H). In the display operation, the gate driver 12 sequentially applies the scan signal Vscan to the scan signal lines GCL to perform display scanning. In the touch detection operation, the drive electrode driver 16 sequentially applies the AC drive signal VcomAC to each of the drive electrode blocks B to perform touch detection scanning, and the touch detection section 40 detects a touch event, based on the touch detection signal Vdet output from the touch detection electrode TDL. The detail thereof will be described below.

First, at timing t1, one horizontal period (1H) begins, and the touch detection period Pt also begins.

The drive electrode driver 16 applies the AC drive signal VcomAC to the drive electrodes COML during a period (the touch detection period Pt) from timing t1 to timing t2, and the touch detection section 40 samples the touch detection signal Vdet at sampling timing ts. Specifically, the drive electrode driver 16 applies the AC drive signal VcomAC to the drive electrodes COML configuring k-th drive electrode block B(k) related to the touch detection operation during the touch detection period Pt ((E) of FIG. 10). The AC drive signal VcomAC is transmitted to the touch detection electrodes TDL through the electrostatic capacitance, resulting in change of the touch detection signal Vdet ((F) of FIG. 10). Then, the touch detection section 40 performs touch detection based on the touch detection signal Vdet.

Subsequently, the gate driver 12 applies the scan signal Vscan to n-th scan signal line GCL(n) related to the display operation at timing t2. As a result, the scan signal Vscan(n) is changed from low level to high level ((A) of FIG. 10). Therefore, the gate driver 12 selects one horizontal line to be subjected to display operation.

Then, the source driver 13 supplies, as the pixel signal Vsig, a pixel voltage VR for red sub-pixel SPix to the selection switch section 14 ((B) of FIG. 10), and generates a switch control signal VselR which is at high level during a supply period of the pixel voltage VR ((C) of FIG. 10). Thereafter, the selection switch section 14 allows the switch SWR to be in ON state during a period in which the switch control signal VselR is at high level, to separate the pixel voltage VR supplied from the source driver 13 from the pixel signal Vsig, and supplies the separated pixel voltage as the pixel signal VpixR to the red sub-pixel SPix through the pixel signal line SGL ((D) of FIG. 10). Note that after the switch SWR becomes OFF state, the voltage of the pixel signal line SGL is maintained since the pixel signal line SGL is in floating state ((D) of FIG. 10).

Likewise, the source driver 13 supplies a pixel voltage VG for green sub-pixel SPix together with a corresponding switch control signal VselG to the selection switch section 14 ((B) and (C) of FIG. 10). The selection switch section 14 separates the pixel voltage VG from the pixel signal Vsig based on the switch control signal VselG to supply the separated pixel voltage as the pixel signal VpixG to the green sub-pixel SPix through the pixel signal line SGL ((D) of FIG. 10).

After that, likewise, the source driver 13 supplies a pixel voltage VB for the blue sub-pixel SPix together with a corresponding switch control signal VselB to the selection switch section 14 ((B) and (C) of FIG. 10). The selection switch section 14 separates the pixel voltage VB from the pixel signal Vsig based on the switch control signal VselB to supply the separated pixel voltage as a pixel signal VpixB to the blue sub-pixel SPix through the pixel signal line SGL ((D) of FIG. 10).

Next, the gate driver 12 allows the scan signal Vscan(n) of the n-th scan signal line GCL to be changed from high level to low level at timing t3 ((A) of FIG. 10). Accordingly, the sub-pixel SPix of one horizontal line related to the display operation is electrically disconnected from the pixel signal line SGL.

Then, one horizontal period (1H) ends at timing t4 and new one horizontal period (1H) begins.

Subsequently, by repeating the above-described operations, in the display panel 1, the display operation over the entire display surface is performed through line-sequential scanning, and the touch detection operation is performed over the entire touch detection surface through scanning on the drive electrode block basis described below.

(Touch Detection Operation)

Next, the touch detection operation will be described in detail.

Figure 11:
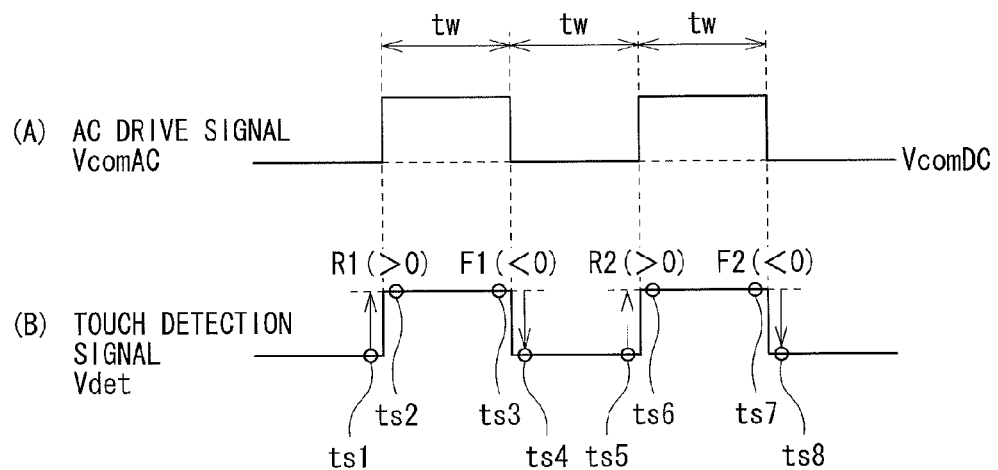
FIG. 11 is a waveform chart illustrating a waveform example of an AC drive signal and a touch detection signal according to the first embodiment.

(A) of FIG. 11 illustrates a waveform of the AC drive signal VcomAC, and (B) of FIG. 11 illustrates a waveform of the touch detection signal Vdet. The AC drive signal VcomAC includes two pulses. A width of each of the two pulses and an interval between the two pulses are set to the same time tw in this example. The time tw is, for example, 2 μsec. The AC drive signal VcomAc is transmitted to the touch detection electrodes TDL through the electrostatic capacitance, and therefore the touch detection signal Vdet as illustrated in (B) of FIG. 11 is generated.

The A/D conversion section 43 of the touch detection section 40 converts, from analog to digital, the output signal of the LPF section 42 which has received the touch detection signal Vdet, at timings (sampling timings ts1 to ts8) before and after each transition of the AC drive signal VcomAC ((B) of FIG. 11), and determines data D(ts1) to D(ts8).

Then, the signal processing section 44 of the touch detection section 40 determines variations R1 (=D(ts2)−D(ts1)), F1 (=D(ts4)−D(ts3)), R2 (=D(ts6)−D(ts5)), and F2 (=D(ts8)−D(ts7)), in each transition of the touch detection signal Vdet, based on the data D(ts1) to D(ts8). Specifically, the variations R1 and R2 each have a positive value (R1, R2>0), and the variations F1 and F2 each have a negative value (F1, F2<0).

Next, the signal processing section 44 uses the following expression to determine detected data DD of the touch detection period Pt, based on the variations R1, F1, R2, and F2.

$$DD = R1 - F1 + R2 - F2 \tag{1}$$

Then, the signal processing section 44 collects detected data DD in the plurality of horizontal periods, and performs the touch detection based on the detected data DD, as will be described below.

Figure 12:
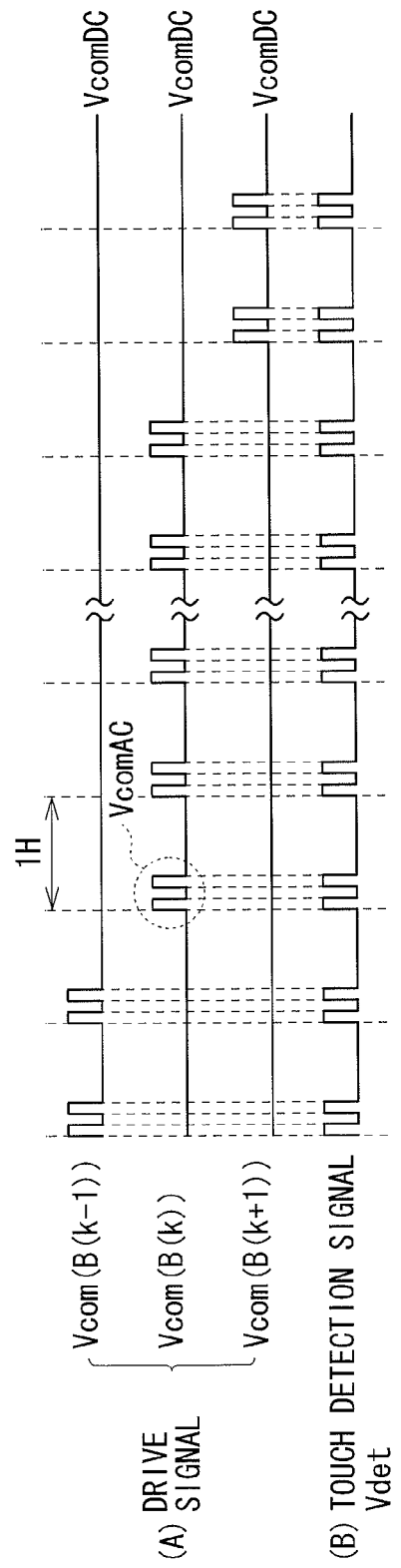
FIG. 12 is a timing waveform chart illustrating touch detection scanning according to the first embodiment.

FIG. 12 illustrates an operation example of the touch detection scanning, where (A) illustrates waveforms of the drive signal Vcom, and (B) illustrates a waveform of the touch detection signal Vdet.

As illustrated in FIG. 12, the drive electrode driver 16 performs the touch detection scanning on the drive electrodes COML by sequentially applying the AC drive signal VcomAC for each drive electrode block B. At this time, the drive electrode driver 16 applies the AC drive signal VcomAC to each drive electrode block B over the plurality of (for example, thirty) predetermined horizontal periods ((A) of FIG. 12). The touch detection section 40 samples the touch detection signal Vdet based on the AC drive signal VcomAC to determine the detected data DD in each of the horizontal periods. Then, the signal processing section 44 determines average of the thirty pieces of detected data DD with use of, for example, a finite impulse response (FIR) filter with 30 taps, and thus detects the presence of a touch event and the like in a region corresponding to the relevant drive electrode block B. In such a way, since the touch detection is performed based on the plurality of sampling results, the sampling results are analyzed statistically, and deterioration of S/N ratio caused by variation of the sampling results is suppressed, thereby improving accuracy of the touch detection.

(Prevention of Malfunction in Touch Detection Operation)

In the electrostatic capacitance type touch panel, there is a possibility that noise (disturbance noise) caused by an inverter fluorescent lamp, AM wave, AC power source, and the like is propagated to the touch panel, resulting in malfunction. The malfunction is caused by the fact that a signal (a touch signal) related to the presence or absence of a touch event is undistinguished from disturbance noise. In the display panel 1, the frequency of the AC drive signal VcomAC is allowed to be easily changed so that such malfunction is reduced. The detail thereof is described below.

Figure 13:
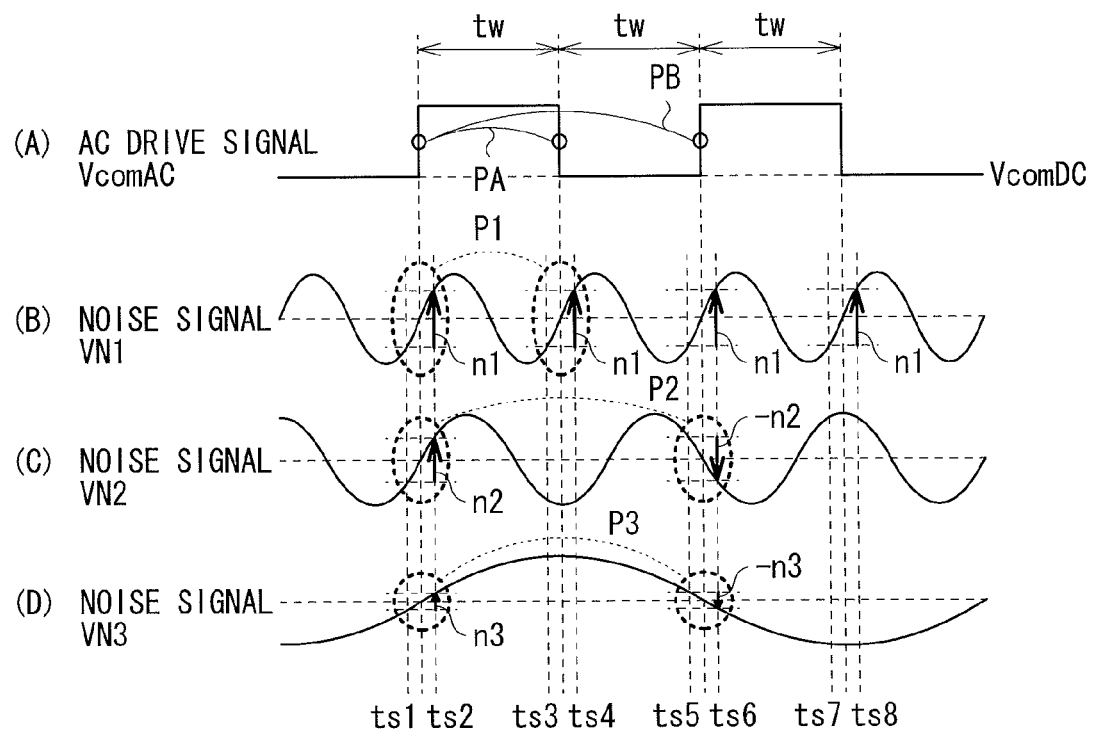
FIG. 13 is a waveform chart illustrating an example of a touch detection operation according to the first embodiment.

FIG. 13 schematically illustrates a sampling operation in the case where disturbance noise is applied, where (A) illustrates a waveform of the AC drive signal VcomAC, and (B) to (D) each illustrate an example of a noise signal superimposed on the touch detection signal Vdet, caused by the disturbance noise.

The case of a noise signal VN1 illustrated in (B) of FIG. 13 is described first. The noise signal VN1 is a signal with a period of the time tw, and in the case where the time tw is 2 μsec, the frequency is 500 kHz.

As illustrated in (B) of FIG. 13, the noise signal VN1 has the same variation (noise n1) before and after each transition of the AC drive signal VcomAC. Therefore, when the noise signal VN1 is superimposed on the touch detection signal Vdet, the detected data DD is as the following expression.

$$DD = (R1 + n1) - (F1 + n1) + (R2 + n1) - (F2 + n1) \tag{2}$$
$$= R1 - F1 + R2 - F2$$

Specifically, for example, noise n1 related to the rise of the first pulse of the AC drive signal VcomAC and noise n1 related to the fall thereof offset each other, and likewise, noise n1 related to the rise of the second pulse of the AC drive signal VcomAC and noise n1 related to the fall thereof offset each other. Therefore, as expressed by the expression (2), the noise n1 does not appear in the detected data DD. In other words, in the noise signal VN1, since a pair P1 of noise n1 with the same polarity is generated in the transition timing pair PA with opposite polarities in the AC drive signal VcomAC, the pair of noise offset each other. Accordingly, the noise signal VN1 does not affect the touch detection operation.

Incidentally, a noise signal having a frequency integral multiple of the frequency of the noise signal VN1 is also offset in accordance with the similar principle. Therefore, such a noise signal does not affect the touch detection operation.

The case of a noise signal VN2 illustrated in (C) of FIG. 13 is described next. The noise signal VN2 is a signal with a period of 4/3 times the time tw, and in the case where the time tw is 2 μsec, the frequency is 375 kHz.

As illustrated in (C) of FIG. 13, the noise signal VN2 changes by noise n2 before and after the rise of the first pulse of the AC drive signal VcomAC, and changes by noise (−n2) before and after the rise of the second pulse. Therefore, when the noise signal VN2 is superimposed to the touch detection signal Vdet, the detected data DD is as the following expression.

$$DD = (R1 + n2) - F1 + (R2 - n2) - F2 \quad (3)$$
$$= R1 - F1 + R2 - F2$$

Specifically, in this example, noise n2 related to the rise of the first pulse of the AC drive signal VcomAC and the noise (−n2) related to the rise of the second pulse of the AC drive signal VcomAC offset each other. Therefore, as expressed by the expression (3), the noise n2 does not appear in the detected data DD. In other words, in the noise signal VN2, since a pair P2 of the noise n2 and the noise (−n2) with opposite polarities is generated in the transition timing pair PB with the same polarity in the AC drive signal VcomAC, the pair of noise offset each other. Accordingly, the noise signal VN2 does not affect the touch detection operation.

Then, the case of a noise signal VN3 illustrated in (D) of FIG. 13 is described. The noise signal VN3 is a signal with a period of four times the time tw, and in the case where the time tw is 2 μsec, the frequency is 125 kHz.

As illustrated in (D) of FIG. 13, the noise signal VN3 changes by noise n3 before and after the rise of the first pulse of the AC drive signal VcomAC, and changes by noise (−n3) before and after the rise of the second pulse. Therefore, when the noise signal VN3 is superimposed to the touch detection signal Vdet, the detected data DD is as the following expression.

$$DD = (R1 + n2) - F1 + (R2 - n2) - F2 \quad (4)$$
$$= R1 - F1 + R2 - F2$$

Specifically, in this example, the noise n3 related to the rise of the first pulse of the AC drive signal VcomAC and the noise (−n3) related to the rise of the second pulse of the AC drive signal VcomAC offset each other. Therefore, as expressed by the expression (4), the noise n3 does not appear in the detected data DD. In other words, in the noise signal VN3, similarly to the case of the noise signal VN2, since a pair P3 of the noise n3 and the noise −n3 with opposite polarities is generated in the transition timing pair PB with the same polarity in the AC drive signal VcomAC, the pair of noise offset each other. Accordingly, the noise signal VN3 does not affect the touch detection operation.

Note that the frequency of the noise signal VN2 is three times the frequency of the noise signal VN3, and as described above, the noise signals VN2 and VN3 are each offset in accordance with the similar principle. In such a way, since a noise signal having a frequency an odd multiple of the frequency of the noise signal VN3 is offset in accordance with the similar principle, the noise signal does not affect the touch detection operation.

As described above, the display panel 1 is allowed to offset noise signals with various frequency such as the noise signals VN1 to VN3. These frequencies are changed by adjusting the time tw, for example. Accordingly, in the display panel 1, in the case where the frequency of the disturbance noise is known, the immunity with respect to the disturbance noise is allowed to be improved by adjusting the pulse width and the pulse interval of the AC drive signal VcomAC to offset the noise.

As described above, in the display panel 1, since the AC drive signal is configured of the plurality of pulses, the immunity with respect to the plurality of noise frequencies (in this example, 125 kHz, 375 kHz, 500 kHz, and the like) is allowed to be enhanced. Accordingly, in the display panel 1, the immunity with respect to the disturbance noise is improved not only in the case where disturbance noise with a single frequency is applied but also in the case where a plurality of disturbance noise frequencies or disturbance noise with a wide spectrum is applied, and the like.

[Effect]

As described above, in the first embodiment, since the AC drive signal is configured of the plurality of pulses, the plurality of noise signals with different frequencies are allowed to be offset, thereby reducing the possibility of malfunction caused by the noise.

[Modification 1-1]

In the first embodiment, although the AC drive signal VcomAC is configured of two pulses, the number of pulses is not limited thereto. Alternatively, for example, the AC drive signal VcomAC may be configured of three or more pulses. As a result, it is possible to offset more noise components, and to improve the immunity with respect to the disturbance noise.

[Modification 1-2]

In the first embodiment, although the pulse width and the pulse interval of the AC drive signal VcomAC are equal to each other, this is not limited thereto. Alternatively, for example, the width of each pulse and the pulse interval may be different from one another.

[Modification 1-3]

In addition to the configuration of the first embodiment, the duration of one horizontal line (1H) may be variable. As a result, for example, it is possible to enhance the immunity with respect to disturbance noise about integral multiple of a frequency corresponding to an inverse of the time of the horizontal period. The detail of a display panel according to the modification 1-3 will be described below.

Figure 14:
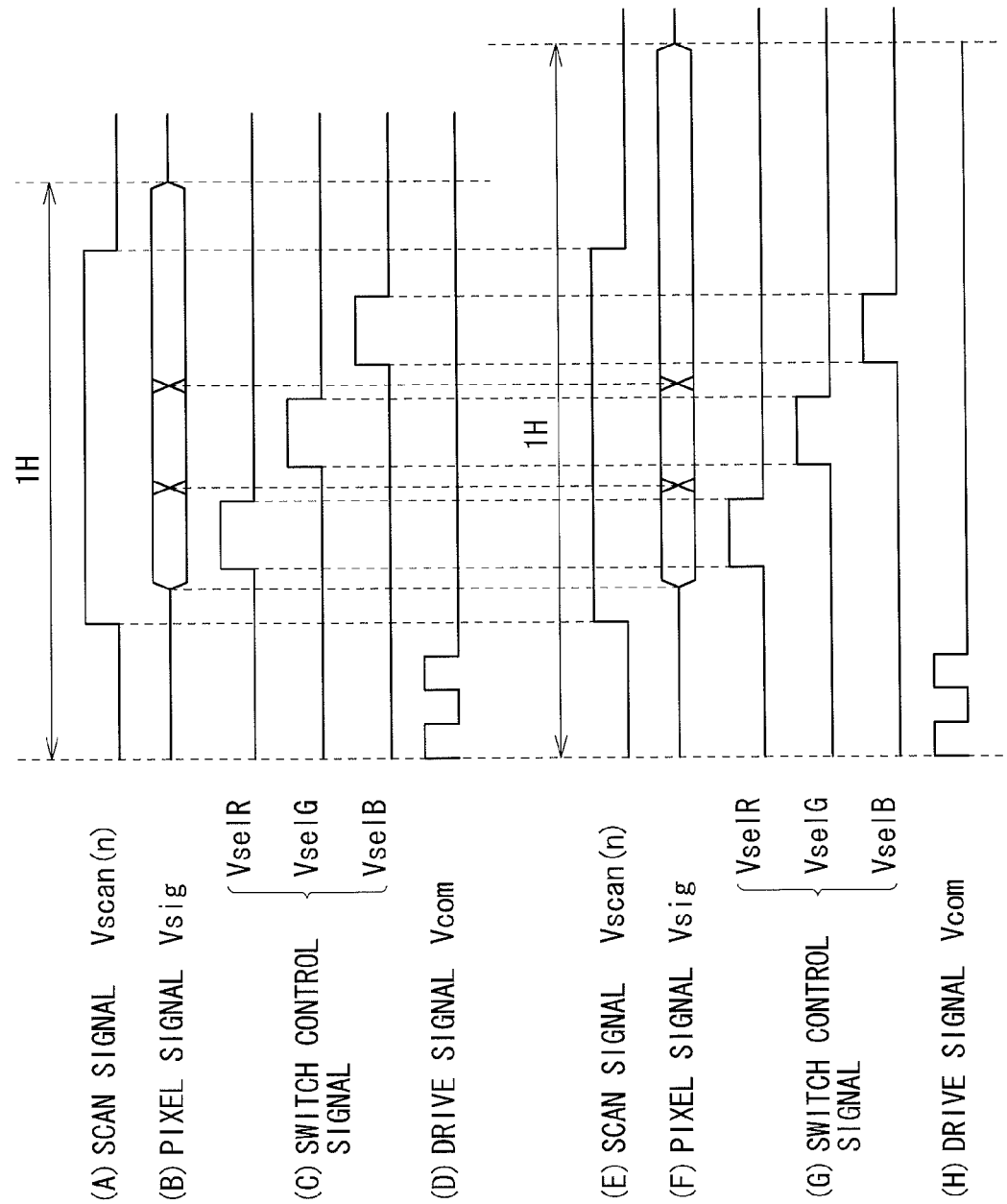
FIG. 14 is a timing chart illustrating an operation example of a display panel according to a modification of the first embodiment.

(A) to (D) of FIG. 14 illustrate a timing chart of operations in the case where the duration of one horizontal period (1H) is short. (E) to (H) of FIG. 14 illustrate a timing chart of operations in the case where the duration of one horizontal period (1H) is long. In FIGS. 14, (A) and (E) each illustrate a waveform of the scan signal Vscan, (B) and (F) each illustrate a waveform of the pixel signal Vsig, (C) and (G) each illustrate waveforms of the switch control signal Vsel, and (D) and (H) each illustrate a waveform of the drive signal Vcom.

In the display panel according to the modification 1-3, as illustrated in FIG. 14, the duration of one horizontal period (1H) is allowed to be varied. As a result, the possibility of the malfunction in the touch detection operation caused by disturbance noise is allowed to be reduced.

Specifically, in the case where the frequency of disturbance noise is about integral multiple of a frequency corresponding to the inverse of the time of one horizontal period, when the disturbance noise is converted from analog to digital by the A/D conversion section 43, the disturbance noise appears as so-called alias near the frequency 0. As a result, the alias is mixed into the touch signal near the frequency 0, and thus the touch signal is not distinguished from the noise signal. In the display panel according to the modification 1-3, since the duration of one horizontal period is allowed to be varied, the touch detection is be performed by selecting condition not affected from the disturbance noise.

[3. Second Embodiment]

Next, a display panel 2 according to a second embodiment is described. In the second embodiment, the AC drive signal VcomAC is configured of one pulse, and the width of the pulse is configured to be variable. In the above-described first embodiment (FIG. 11), the AC drive signal is configured of a plurality of pulses so that immunity with respect to a plurality of noise frequencies is improved. Alternatively, in the second embodiment, the pulse width is varied to provide similar effects. Note that like numerals are used to designate substantially like components of the display panel 1 according to the above-described first embodiment, and the description thereof will be appropriately omitted.

The display panel 2 includes a drive electrode driver 56 (FIG. 4). The drive electrode driver 56 generates an AC drive signal VcomAC configured of one pulse. At this time, the drive electrode driver 56 is allowed to change the width of the pulse.

Figure 15:
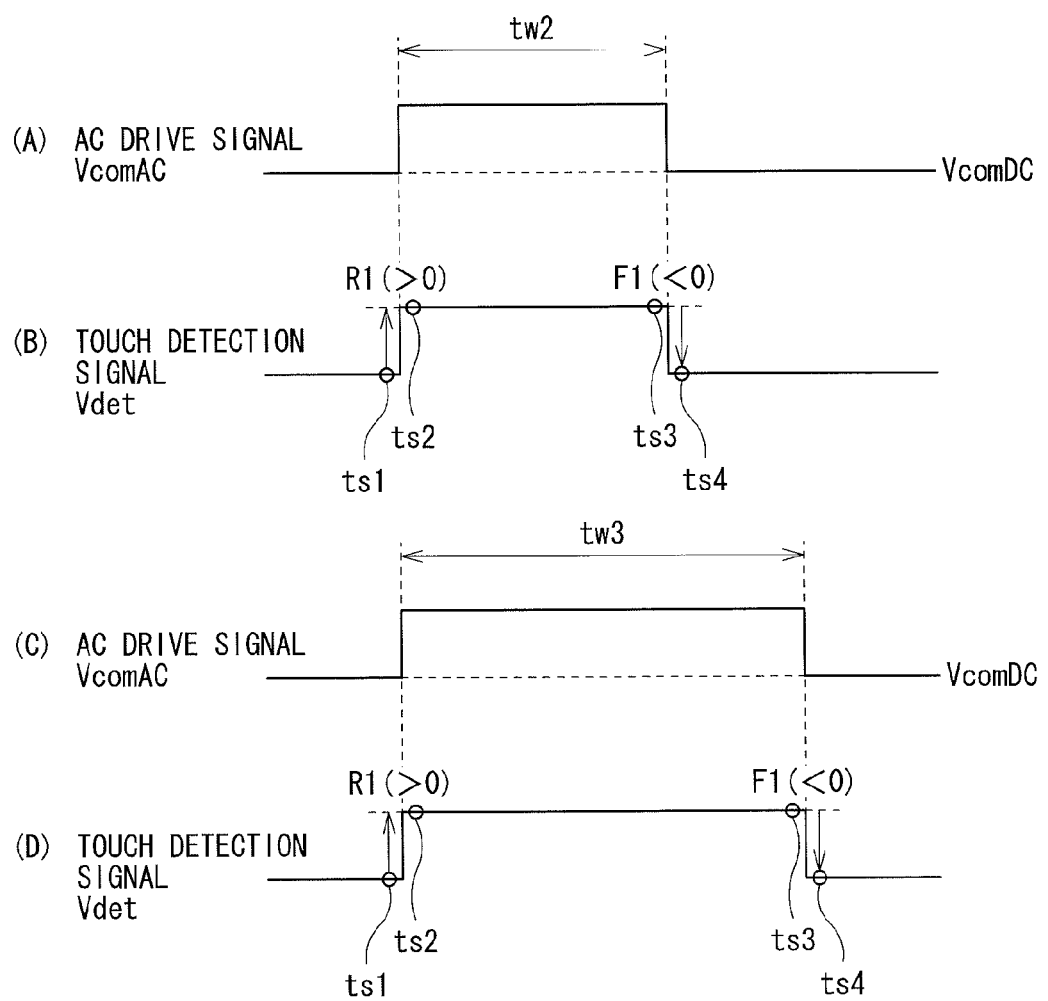
FIG. 15 is a waveform chart illustrating waveform examples of an AC drive signal and a touch detection signal according to a second embodiment of the disclosure.

(A) and (B) of FIG. 15 illustrate a waveform of the AC drive signal VcomAC and a waveform of the touch detection signal Vdet, respectively, in the case of a reduced pulse width (case C1), and (C) and (D) of FIG. 15 illustrate a waveform of the AC drive signal VcomAC and a waveform of the touch detection signal Vdet, respectively, in the case of an increased pulse width (case C2). A pulse width tw2 in the case C1 ((A) of FIG. 15) is, for example, 4 μsec, and a pulse width tw3 in the case C2 ((C) of FIG. 15) is, for example, 6 μsec. Similarly to the case of the first embodiment, the AC drive signal VcomAC ((A) and (C) of FIG. 15) is transmitted to the touch detection electrodes TDL through the electrostatic capacitance to generate the touch detection signal Vdet illustrated in (B) and (D) of FIG. 15.

The A/D conversion section 43 of the touch detection section 40 converts, from analog to digital, the output signal of the LPF section 42 which has received the touch detection signal Vdet, at timings (sampling timings ts1 to ts4) before and after each transition of the AC drive signal VcomAC ((B) and (D) of FIG. 15), and determines data D(ts1) to D(ts4).

Then, based on data D(ts1) to D(ts4), the signal processing section 44 of the touch detection section 40 determines variations R1 (=D(ts2)−D(ts1)) and F1 (=D(ts4)−D(ts3)), in each transition of the touch detection signal Vdet. The variation R1 has a positive value (R1>0), and the variation F1 has a negative value (F1<0).

After that, the signal processing section 44 determines detected data DD in the touch detection period Pt, with use of the following expression, based on the variations R1 and F1.

$$DD = R1 - F1 \qquad (5)$$

Then, similarly to the case of the first embodiment, the signal processing section 44 performs touch detection, based on the detected data DD which is collected during the plurality of horizontal periods.

Next, the operation when disturbance noise is applied is described as for the case of the reduced pulse width (case C1) and as for the case of the increased pulse width (case C2).

Figure 16:
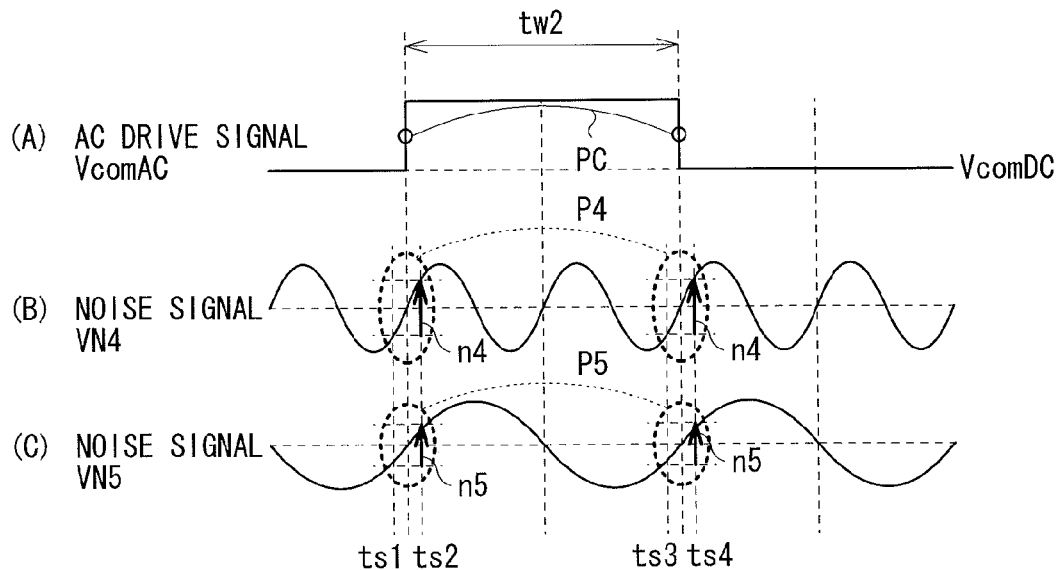
FIG. 16 is a waveform chart illustrating an example of a touch detection operation according to the second embodiment.

FIG. 16 schematically illustrates the sampling operation in the case of the reduced pulse width (C1), where (A) illustrates a waveform of the AC drive signal VcomAC, and (B) and (C) each illustrate an example of a noise signal superimposed to the touch detection signal Vdet.

A noise signal VN4 ((B) of FIG. 16) is a signal with a period of half the time tw2, and when the time tw2 is 4 μsec, the frequency of the noise signal VN4 is 500 kHz. As illustrated in (B) of FIG. 16, the noise signal VN4 has the same variation (noise n4) in each transition of the AC drive signal VcomAC. Therefore, when the noise signal VN4 is superimposed to the touch detection signal Vdet, the detected data DD is as the following expression.

$$DD = (R1 + n4) - (F1 + n4) \qquad (6)$$
$$= R1 - F1$$

Specifically, noise n4 related to the rise of the AC drive signal VcomAC and noise n4 related to the fall thereof offset each other. As a result, as expressed by the expression (6), the noise n4 does not appear in the detected data DD.

A noise signal VN5 ((C) of FIG. 16) is a signal with a period of the time tw2, and when the time tw2 is 4 μsec, the frequency of the noise signal VN5 is 250 kHz. As illustrated in (C) of FIG. 16, the noise signal VN5 has the same variation (noise n5) in each transition of the AC drive signal VcomAC. Therefore, similarly to the case of the noise signal VN4, the noise n5 does not appear in the detected data DD.

As described above, in the noise signals VN4 and VN5, a pair of noise with the same polarity is generated in a transition timing pair PC with opposite polarities in the AC drive signal VcomAC, therefore the pair of noise offset each other. Likewise, a noise signal having a frequency integral multiple of the frequency of the noise signal VN5 is offset in accordance with the similar principle, thereby not affecting the touch detection operation.

Figure 17:
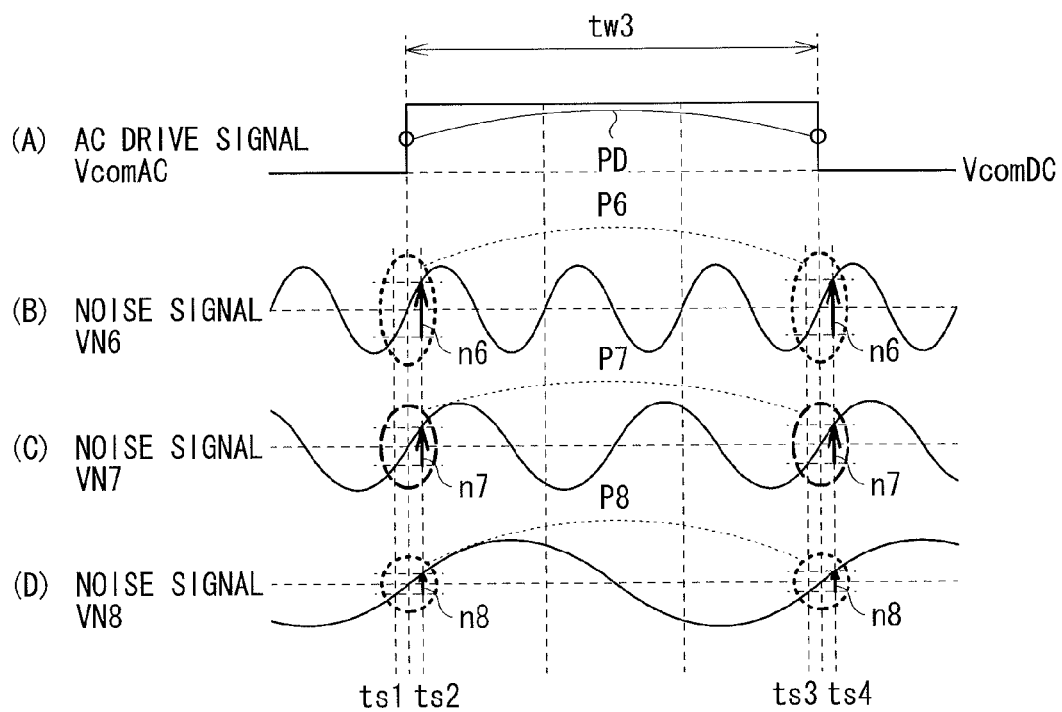
FIG. 17 is a waveform chart illustrating another example of the touch detection operation according to the second embodiment.

FIG. 17 schematically illustrates the sampling operation in the case of the increased pulse width (case C2), where (A) illustrates a waveform of the AC drive signal VcomAC, and (B) to (D) each illustrate an example of a noise signal superimposed to the touch detection signal Vdet.

A noise signal VN6 ((B) of FIG. 17) is a signal with a period of one third of the time tw3, and when the time tw3 is 6 μsec, the frequency of the noise signal VN6 is 500 kHz. As illustrated in (B) of FIG. 17, the noise signal VN6 has the same variation (noise n6) in each transition of the AC drive signal VcomAC. Therefore, when the noise signal VN6 is superimposed to the touch detection signal Vdet, the detected data DD is as the following expression.

$$DD = (R1 + n6) - (F1 + n6) \qquad (7)$$
$$= R1 - F1$$

Specifically, noise n6 related to the rise of the AC drive signal VcomAC and noise n6 related to the fall thereof offset each other. As a result, the noise n6 does not appear in the detected data DD as expressed by the expression (7).

A noise signal VN7 ((C) of FIG. 17) is a signal with a period of half the time tw3, and when the time tw3 is 6 μsec, the frequency of the noise signal VN7 is 333 kHz. As illustrated in (C) of FIG. 17, the noise signal VN7 has the same variation (noise n7) in each transition of the AC drive signal VcomAC. Therefore, similarly to the case of the noise signal VN6, the noise n7 does not appear in the detected data DD.

A noise signal VN8 ((D) of FIG. 17) is a signal with a period of the time tw3, and when the time tw3 is 6 μsec, the frequency of the noise signal VN8 is 166 kHz. As illustrated in (D) of FIG. 17, the noise signal VN8 has the same variation (noise n8) in each transition of the AC drive signal VcomAC. Therefore, similarly to the case of the noise signal VN6, the noise n8 does not appear in the detected data DD.

As described above, in the noise signals VN6 to VN8, a pair of noise with the same polarity is generated in the transition timing pair PD with the opposite polarities in the AC drive signal VcomAC, and therefore the pair of noise offset each other. Likewise, the noise signal with a frequency integral multiple of the frequency of the noise signal VN8 is offset in accordance with the similar principle, thereby not affecting the touch detection operation.

As described above, in the display panel 2, in the case of the reduced pulse width (case C1), noise having a frequency of 250 kHz, 500 kHz, or the like is offset in this example, and in the case of the increased pulse width (case C2), noise having a frequency of 166 kHz, 333 kHz, 500 kHz, or the like is offset in this example. As a result, in the display panel 2, immunity with respect to various noise frequencies is improved by varying the pulse width.

Specifically, for example, setting (pulse width) less affected by noise is determined by varying the pulse width, and then the touch detection operation may be performed using the setting. Alternatively, for example, the touch detection operation is performed while the pulse width is varied constantly during a predetermined period (for example, on a frame basis), and only a detection result under a noisy condition may be discarded. Moreover, for example, the touch detection operation is performed regularly with a predetermined pulse width, and when the noise is observed, the touch detection operation may be continued with a varied pulse width. Note that as the method of determining noise, for example, a method of using detected data of the entire touch detection surface obtained from the touch detection operation and a method of providing a dedicated frame for determining noise are allowed to be used.

As described above, in the second embodiment, the pulse width is varied so that a plurality of noise signals with different frequencies are allowed to be offset each other, and thus the possibility of malfunction due to the noise is allowed to be reduced.

[Modification 2-1]

In the above-described second embodiment, although the pulse width is switched between the two pulse widths tw2 and tw3 (cases C1 and C2), this is not limitative. Alternatively, the pulse width may be switched between three or more pulse widths.

[Modification 2-2]

Also in the second embodiment, similarly to the modification 1-3 of the first embodiment, the duration of one horizontal period (1H) may be configured to be variable.

[Modification 2-3]

Figure 18:
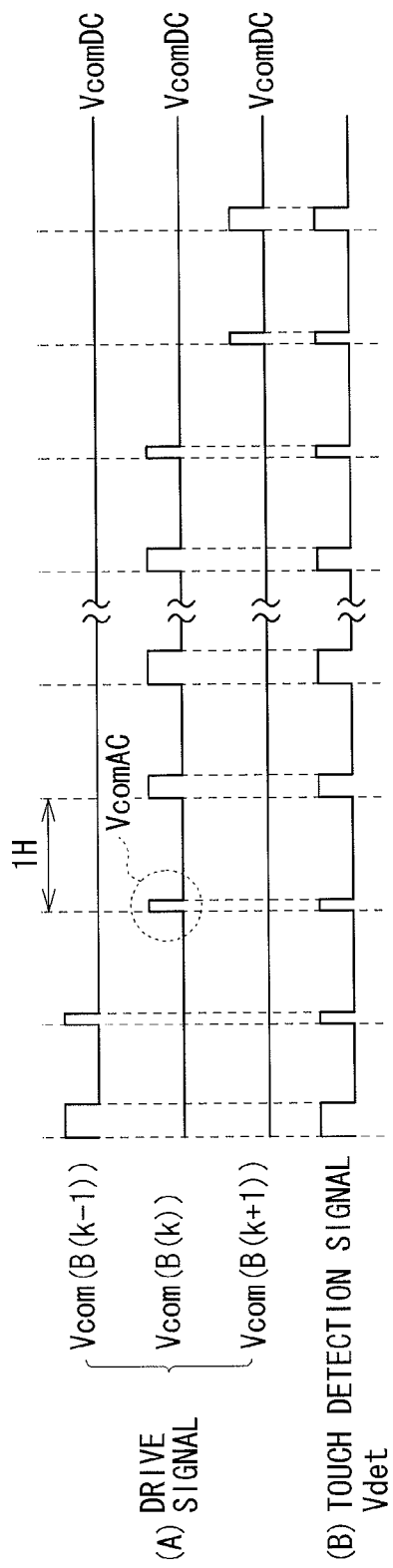
FIG. 18 is a timing waveform chart illustrating touch detection scanning according to a modification of the second embodiment.

In the second embodiment, the touch detection operation is performed by, for example, an FIR filter, based on the detected data DD obtained with use of the AC drive signal VcomAC with pulses of the same width. However, this is not limitative, and alternatively, for example, as illustrated in FIG. 18, the touch detection operation may be performed based on the detected data DD obtained by switching the pulse width for each horizontal period and using the AC drive signal VcomAC with pulses of different widths.

[4. Third Embodiment]

Next, a display panel 3 according to a third embodiment is described. In the third embodiment, the AC drive signal VcomAC is configured of a plurality of pulses similarly to the first embodiment, and the pulse width and the pulse interval are configured to be variable similarly to the second embodiment. Incidentally, like numerals are used to designate substantially like components of the display panels 1 and 2 according to the first and second embodiments, and the description thereof will be appropriately omitted.

The display panel 3 includes a drive electrode driver 66 (FIG. 4). The drive electrode driver 66 generates an AC drive signal VcomAC configured of a plurality of pulses. At this time, the drive electrode driver 66 is allowed to change the pulse width and the pulse interval.

Figure 19:
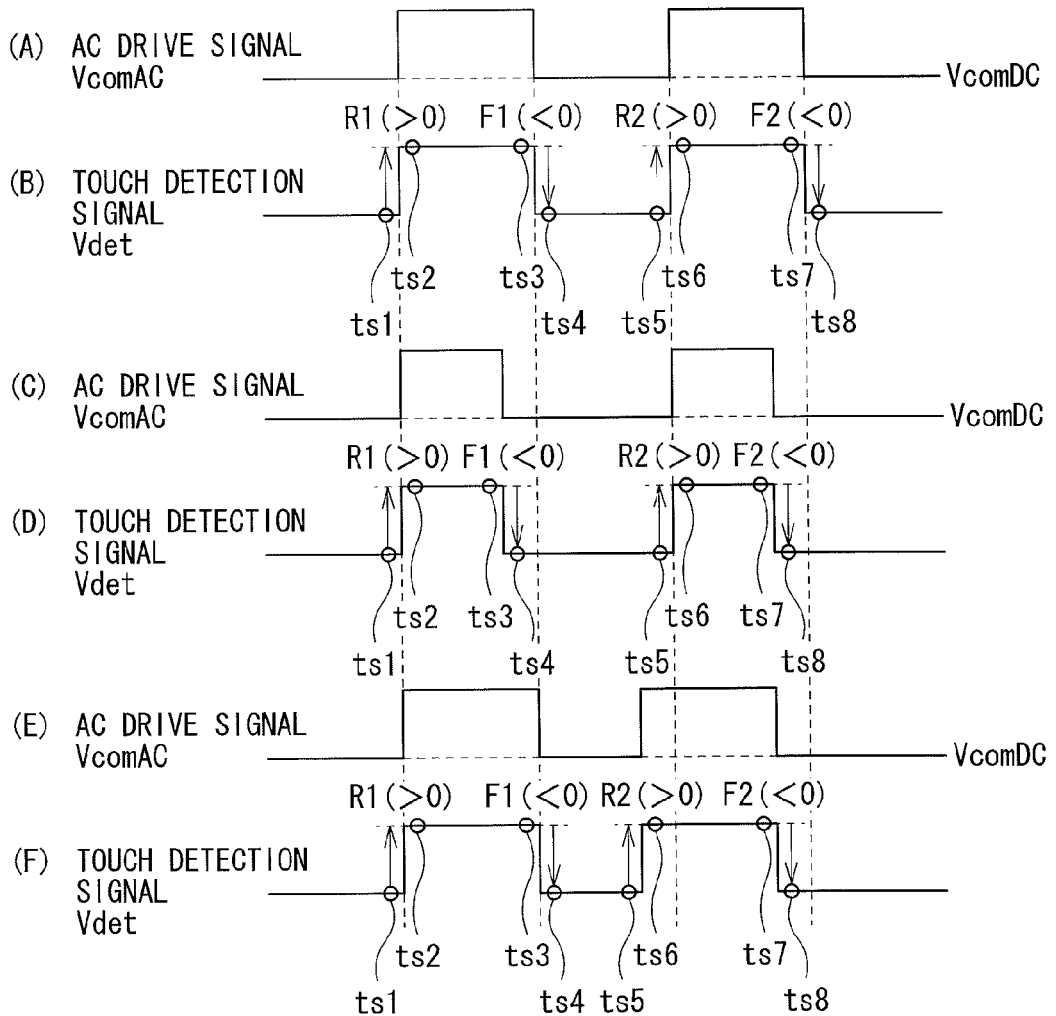
FIG. 19 is a waveform chart illustrating waveform examples of an AC drive signal and a touch detection signal according to a third embodiment of the disclosure.

(A) and (B) of FIG. 19 illustrate an example of a waveform of the AC drive signal VcomAC and the touch detection signal Vdet, respectively, (C) and (D) of FIG. 19 illustrate a waveform of the AC drive signal VcomAC and a waveform of the touch detection signal Vdet, respectively, in the case of the reduced pulse width with maintained pulse period, and (E) and (F) of FIG. 19 illustrate a waveform of the AC drive signal VcomAC and a waveform of the touch detection signal Vdet, respectively, in the case of the reduced pulse interval with maintained pulse width.

Similarly to the case of the first embodiment, the A/D conversion section 43 of the touch detection section 40 converts, from analog to digital, the output signal of the LPF section 42 which has received the touch detection signal Vdet, at timings (sampling timings ts1 to ts8) before and after each transition of the AC drive signal VcomAC ((B), (D), and (F) of FIG. 19), and determines data D(ts1) to D(ts8). Then, the signal processing section 44 of the touch detection section 40 determines detected data DD, based on the data D(ts1) to D(ts8), thereby performing the touch detection based on the detected data DD.

Similarly to the case of the display panel 2 according to the second embodiment, in the display panel 3, setting (pulse width) less affected by noise is determined by varying the pulse width and the pulse interval, and then the touch detection operation is performed using the setting. As a result, the immunity with respect to various noise frequencies is allowed to be enhanced.

As described above, in the third embodiment, the pulse width and the pulse interval are varied to reduce the possibility of malfunction due to noise. The other effects are similar to those in the first embodiment.

[Modification 3-1]

In the third embodiment, similarly to the modification 1-1 of the first embodiment, the AC drive signal VcomAC may be configured of three or more pulses, for example, or the duration of one horizontal period (1H) may be configured to be variable similarly to the modification 1-3 of the first embodiment.

[Modification 3-2]

In the third embodiment, similarly to the modification 2-3 of the second embodiment, the touch detection operation may be performed while switching the pulse width for each horizontal period, for example.

[5. Application Examples]

Next, application examples of the display panel according to any of the above-described embodiments and modifications will be described.

FIG. 20 illustrates an appearance of a television to which the display panel according to any of the embodiments and the like is applied. The television includes, for example, an image display screen section 510 including a front panel 511 and a filter glass 512, and the image display screen section 510 is configured of the display panel according to any of the embodiments and the like.

The display panel according to any of the embodiments and the like is applicable to electronic units in various fields, such as a digital camera, a notebook personal computer, a portable terminal device such as a mobile phone, a portable game device, and a video camera, in addition to such a television. In other words, the display panel according to any of the embodiments and the like is applicable to electronic units in various fields for displaying an image.

Hereinbefore, although the technology has been described with referring to the embodiments, the modifications, and the application examples to the electronic units, the technology is not limited thereto, and various modifications may be made.

For example, in each of the embodiments, at the time of the touch detection operation, the drive electrodes COML are driven and scanned for each drive electrode block B configured of a predetermined number of drive electrodes COML. However, this is not limitative, and alternatively, for example, a predetermined number of drive electrodes COML are driven at a time and scanning is performed through shifting the drive electrodes COML to be driven one by one. The detail thereof will be described below.

FIGS. 21A to 21C schematically illustrate an example of the touch detection operation according to one modification. The drive electrode driver according to the modification applies the AC drive signal VcomAC to the predetermined number of drive electrodes COML at a time. Specifically, the drive electrode driver applies the AC drive signal VcomAC to the predetermined number of (in this case, five) drive electrodes COML at a time (hatched portion), and shifts the drive electrodes COML to be supplied with the AC drive signal VcomAC one by one to perform the touch detection scanning. Incidentally, although the AC drive signal VcomAC is applied to the five drive electrodes COML at a time in this example, the number of the drive electrodes COML is not limited thereto. Alternatively, the AC drive signal VcomAC may be applied to four or less, or six or more drive electrodes COML at a time. In addition, although the drive electrodes COML to be supplied with the AC drive signal VcomAC are shifted one by one in this example, this is not limited thereto. Alternatively, the drive electrodes COML may be shifted two or more by two or more.

Figure 22:
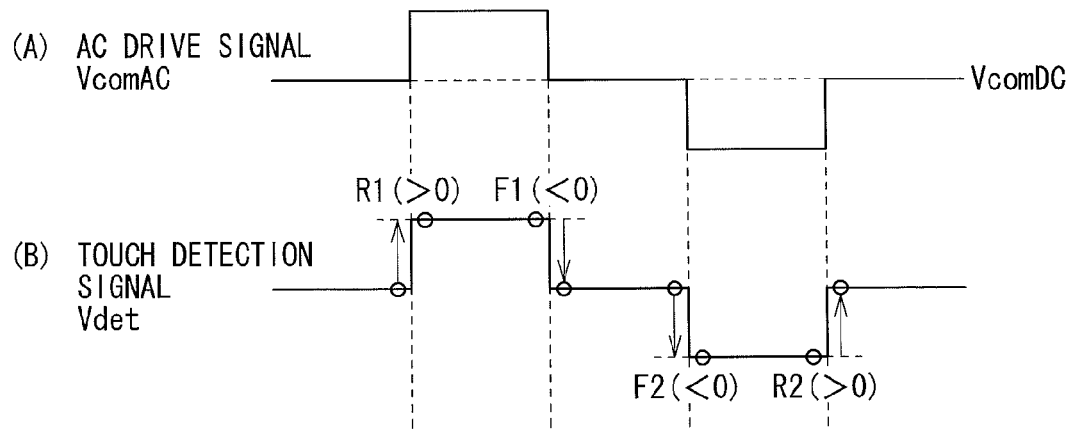
FIG. 22 is a waveform chart illustrating a waveform example of an AC drive signal and a touch detection signal according to another modification.
Figure 23:
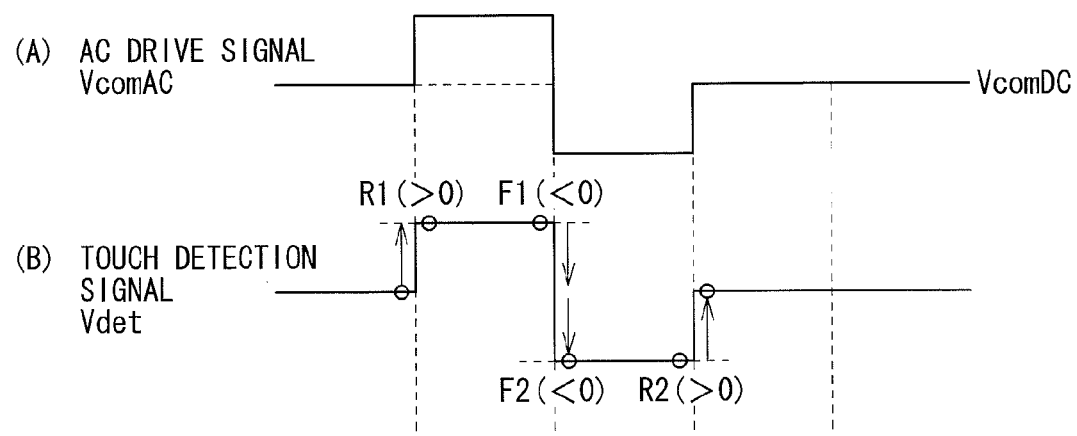
FIG. 23 is a waveform chart illustrating a waveform example of the AC drive signal and the touch detection signal according to another modification.

In addition, for example, in the above-described embodiments and the like, the AC drive signal VcomAC is configured using a pulse of a positive voltage based on the DC drive signal VcomDC, for example, as illustrated in FIG. 11. However, this is not limitative, and alternatively, the AC drive signal VcomAC may be configured using a pulse of a negative voltage. Moreover, in the above-described first embodiment and the like, the AC drive signal VcomAC may be configured using both a pulse of a positive voltage and a pulse of a negative voltage, for example, as illustrated in FIGS. 22 and 23. The AC drive signal VcomAC illustrated in FIG. 22 is configured of a pulse of a positive voltage as a first pulse and a pulse of a negative voltage as a second pulse. The AC drive signal VcomAC illustrated in FIG. 23 is configured to set an interval between two pulses illustrated in FIG. 22 to 0 (zero).

Furthermore, for example, in the above-described embodiments and the like, as illustrated in FIG. 6, the drive electrodes COML are formed on the TFT substrate 21, and the pixel electrodes 22 are formed on the drive electrodes COML with the insulating film 23 in between. However, the configuration is not limited thereto, and alternatively, for example, the pixel electrodes 22 may be formed on the TFT substrate 21, and the drive electrodes COML may be formed on the pixel electrodes 22 with the insulating film 23 in between.

Figure 24:
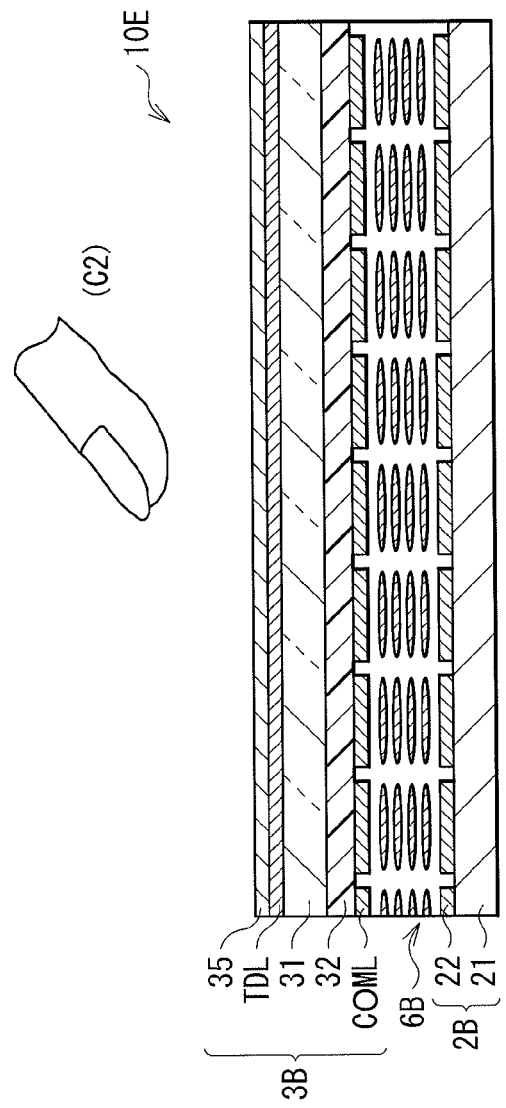
FIG. 24 is a sectional view illustrating a schematic cross-sectional configuration of a display device with a touch detection function according to another modification.

Moreover, for example, in the above described embodiments and the like, the touch detection device is integrated with the liquid crystal display device which is configured using a liquid crystal of lateral electric field mode such as FFS and IPS. Alternatively, the touch detection device may be integrated with a liquid crystal display device which is configured using a liquid crystal of various modes such as twisted nematic (TN), vertical alignment (VA), and electrically controlled birefringence (ECB). In the case of using such a liquid crystal, the display device with a touch detection function may be configured as illustrated in FIG. 24. FIG. 24 illustrates an example of a cross-sectional configuration of a main part of a display device with a touch detection function 10 according to the modification, and illustrates a state where a liquid crystal layer 6B is held between a pixel substrate 2B and an opposed substrate 3B. The names, functions, and the like of the other portions are similar to those in the case of FIG. 6, and therefore the description is omitted. In this example, unlike the case of FIG. 6, the drive electrodes COML used both for display and for touch detection are formed on the opposed substrate 3.

Note that the technology may be configured as follows.

(1) A display including:

display elements;

drive electrodes;

touch detection electrodes each forming an electrostatic capacitance with corresponding one of the drive electrodes; and a drive section applying an AC drive signal to the drive electrodes during each of a plurality of touch detection periods, the AC drive signal involving multiple transition to generate one or more transition timing pairs, wherein the AC drive signal includes at least a first transition timing pair and a second transition timing pair over the plurality of touch detection periods, the first transition timing pair having a first transition interval, and the second transition timing pair having a second transition interval different from the first transition interval.

(2) The display according to (1), wherein the first transition timing pair and the second transition timing pair exist in the same touch detection period.

(3) The display according to (2), wherein a pulse width and a pulse interval of the AC drive signal in one of the touch detection periods are different from a pulse width and a pulse interval in one of the remaining touch detection periods.

(4) The display according to (1), wherein the first transition timing pair exists in the touch detection period different from the touch detection period in which the second transition timing pair exists.

(5) The display according to any one of (1) to (4), further including a detection section sampling a detected signal output from each of the touch detection electrodes at timings before and after each transition of the AC drive signal, and determining a sum of variations of a result of the sampling in each transition.

(6) The display according to any one of (1) to (5), wherein an interval of the plurality of touch detection periods is varied.

(7) The display according to any one of (1) to (6), wherein the drive section applies the AC drive signal to every predetermined number of the drive electrodes.

(8) The display according to (7), wherein the drive section applies the AC drive signal to the same drive electrodes over a predetermined number of touch detection periods.

(9) The display according to (8), wherein each transition timing of the AC drive signal in one of the predetermined number of touch detection periods is different from each transition timing in one of the remaining of the predetermined number of touch detection periods.

(10) The display according to any one of (1) to (9), wherein the touch detection period is provided for each horizontal period of display operation.

(11) The display according to any one of (1) to (10), wherein the display element includes
a liquid crystal layer, and
a pixel electrode formed between the liquid crystal layer and the drive electrode, or arranged to face the liquid crystal layer with the drive electrode in between.

(12) The display according to any one of (1) to (10), wherein the display element includes
a liquid crystal layer, and
a pixel electrode arranged to face the drive electrodes with the liquid crystal layer in between.

(13) The display according to (11) or (12), wherein the drive section applies a display drive signal to the drive electrodes in periods other than the touch detection periods.

(14) A touch detection unit including:
drive electrodes;
touch detection electrodes each forming an electrostatic capacitance with corresponding one of the drive electrodes; and
a drive section applying an AC drive signal to the drive electrodes during each of a plurality of touch detection periods, the AC drive signal involving multiple transition to generate one or more transition timing pairs, wherein
the AC drive signal includes at least a first transition timing pair and a second transition timing pair over the plurality of touch detection periods, the first transition timing pair having a first transition interval, and the second transition timing pair having a second transition interval different from the first transition interval.

(15) A driving method including:
generating an AC drive signal that involves multiple transition to generate one or more transition timing pairs; and
applying the AC drive signal to drive electrodes during each of a plurality of touch detection periods, the drive electrode forming an electrostatic capacitance with touch detection electrodes, wherein
the AC drive signal includes at least a first transition timing pair and a second transition timing pair over the plurality of touch detection periods, the first transition timing pair having a first transition interval, and the second transition timing pair having a second transition interval different from the first transition interval.

(16) An electronic unit including a display and a control section controlling operation using the display, the display including:
display elements;
drive electrodes;
touch detection electrodes each forming an electrostatic capacitance with corresponding one of the drive electrodes; and
a drive section applying an AC drive signal to the drive electrodes during each of a plurality of touch detection periods, the AC drive signal involving multiple transition to generate one or more transition timing pairs, wherein
the AC drive signal includes at least a first transition timing pair and a second transition timing pair over the plurality of touch detection periods, the first transition timing pair having a first transition interval, and the second transition timing pair having a second transition interval different from the first transition interval.

The present application contains subject matter related to that disclosed in Japanese Priority Patent Application JP 2011-214869 filed in the Japan Patent Office on Sep. 29, 2011, the entire content of which is hereby incorporated by reference.

It should be understood by those skilled in the art that various modifications, combinations, sub-combinations, and alterations may occur depending on design requirements and other factors insofar as they are within the scope of the appended claims or the equivalents thereof.

What is claimed is:
1. A display comprising:
display elements;
drive electrodes;
touch detection electrodes each forming an electrostatic capacitance with a corresponding one of the drive electrodes;
a drive section that applies an AC drive signal to the drive electrodes during each of a plurality of touch detection periods, the AC drive signal involving multiple transitions to generate one or more transition timing pairs; and
a detection section that samples respective detected signals output from each of the touch detection electrodes at timings before and after each transition of the AC drive signal and that performs touch detection using a sum of variations of a result of the sampling in each transition, wherein,
(a) the AC drive signal includes, over the plurality of the touch detection periods, at least (1) a first transition timing pair that has a first transition interval and that includes a first pulse rise transition interval, then a first pulse fall transition; and (2) a second transition timing pair that has a second transition interval different from the first transition interval and that includes a second pulse rise transition, the second transition interval, then a second pulse fall transition,
(b) the sum of variations is determined by adding (1) a first variation based on an absolute value of the subtraction of a voltage value of the detected signal at a first timing from a voltage value of the detected signal at a second timing, the first timing being immediately before the first pulse rise transition and the second timing being immediately after the first pulse rise transition; (2) a second variation based on an absolute value of the subtraction a voltage value of a detected signal at a third timing from a voltage value of a detected signal at a fourth timing, the third timing being immediately before the first pulse fall transition and the fourth timing being immediately after the first pulse fall transition; (3) a third variation based on an absolute value of the subtraction of a voltage value of a detected signal at a fifth timing from a voltage value of a detected signal at a sixth timing, the fifth timing being immediately before the second pulse rise tran- sition and the sixth timing immediately after the second pulse rise transition; and (4) a fourth variation based on an absolute value of the subtraction of a voltage value of a detected signal at a seventh timing from a voltage value of a detected signal at an eighth timing, the seventh timing being immediately before the second pulse fall transition and the eighth timing being immediately after the second pulse fall transition, and (c) noise signals that have different frequencies are offset by operation of the detection section.

2. The display according to claim 1, wherein the first transition timing pair exists in a touch detection period different from a touch detection period in which the second transition timing pair exists.

3. The display according to claim 1, wherein an interval of the plurality of touch detection periods is varied.

4. The display according to claim 1, wherein the drive section applies the AC drive signal to a predetermined number of the drive electrodes.

5. The display according to claim 4, wherein the drive section applies the AC drive signal to the same drive electrodes over a predetermined number of touch detection periods.

6. The display according to claim 5, wherein each transition timing of the AC drive signal in one of the predetermined number of touch detection periods is different from each transition timing in one of the remaining of the predetermined number of touch detection periods.

7. The display according to claim 1, wherein a touch detection period is provided for each horizontal period of display operation.

8. The display according to claim 1, wherein the display element includes:
a liquid crystal layer, and
a pixel electrode formed between the liquid crystal layer and the drive electrode, or arranged to face the liquid crystal layer with the drive electrode in between.

9. The display according to claim 8, wherein the drive section applies a display drive signal to the drive electrodes in periods other than the touch detection periods.

10. The display according to claim 1, wherein the display element includes:
a liquid crystal layer, and
a pixel electrode arranged to face the drive electrodes with the liquid crystal layer in between.

11. The display according to claim 1, wherein a pulse width and a pulse interval of the AC drive signal in one of the touch detection periods are different from a pulse width and a pulse interval in one of the remaining touch detection periods.

12. The display of claim 11, wherein the at least two AC transition periods occur in two different horizontal scan periods.

13. The display according to claim 1, wherein the detection section is configured to offset a first noise signal of the noise signals which has a period that is the same as one of the first transition interval and the second transition interval.

14. The display according to claim 13, wherein the detection section is configured to offset a second noise signal of the noise signals which has a frequency integral multiple of the frequency of the first noise signal.

15. The display of claim 1, wherein at least two AC transition periods occur during a detection period during a same horizontal scan period.

16. A touch detection unit comprising:
drive electrodes;
touch detection electrodes each forming an electrostatic capacitance with a corresponding one of the drive electrodes;
a drive section that applies an AC drive signal to the drive electrodes during each of a plurality of touch detection periods, the AC drive signal involving multiple transition to generate one or more transition timing pairs; and
a detection section that samples respective detected signals output from each of the touch detection electrodes at timings before and after each transition of the AC drive signal and that performs touch detection using a sum of variations of a result of the sampling in each transition, wherein, (a) the AC drive signal includes, over the plurality of the touch detection periods, at least (1) a first transition timing pair that has a first transition interval and that includes a first pulse rise transition, the first transition interval, then a first pulse fall transition; and (2) a second transition timing pair that has a second transition interval different from the first transition interval and that includes a second pulse rise transition, the second transition interval, then a second pulse fall transition, (b) the sum of variations is determined by adding (1) a first variation based on an absolute value of the subtraction of a voltage value of the detected signal at a first timing from a voltage value of the detected signal at a second timing, the first timing being immediately before the first pulse rise transition and the second timing being immediately after the first pulse rise transition; (2) a second variation based on an absolute value of the subtraction a voltage value of a detected signal at a third timing from a voltage value of a detected signal at a fourth timing, the third timing being immediately before the first pulse fall transition and the fourth timing being immediately after the first pulse fall transition; (3) a third variation based on an absolute value of the subtraction of a voltage value of a detected signal at a fifth timing from a voltage value of a detected signal at a sixth timing, the fifth timing being immediately before the second pulse rise transition and the sixth timing immediately after the second pulse rise transition; and (4) a fourth variation based on an absolute value of the subtraction of a voltage value of a detected signal at a seventh timing from a voltage value of a detected signal at an eighth timing, the seventh timing being immediately before the second pulse fall transition and the eighth timing being immediately after the second pulse fall transition, and (c) noise signals that have different frequencies are offset by operation of the detection section.

17. A driving method comprising:
generating an AC drive signal that involves multiple transition to generate one or more transition timing pairs;
applying the AC drive signal to drive electrodes during each of a plurality of touch detection periods, the drive electrode forming an electrostatic capacitance with touch detection electrodes;
sampling a detected signal output from each of the touch detection electrodes at timings before and after each transition of the AC drive signal; and
determining a sum of variations of a result of the sampling in each transition, wherein,
(a) the AC drive signal includes, over the plurality of touch detection periods, at least (1) a first transition timing pair that has a first transition interval and that includes a first pulse rise transition, the first transition interval, then a first pulse fall transition; and (2) a second transition timing pair that has a second transition interval different from the first transition interval and that includes a second pulse rise transition, the second transition interval, then a second pulse fall transition,
(b) the sum of variations is determined by adding (1) a first variation based on an absolute value of the subtraction of a voltage value of the detected signal at a first timing from a voltage value of the detected signal at a second timing, the first timing being immediately before the first pulse rise transition and the second timing being immediately after the first pulse rise transition; (2) a second variation based on an absolute value of the subtraction a voltage value of a detected signal at a third timing from a voltage value of a detected signal at a fourth timing, the third timing being immediately before the first pulse fall transition and the fourth timing being immediately after the first pulse fall transition; (3) a third variation based on an absolute value of the subtraction of a voltage value of a detected signal at a fifth timing from a voltage value of a detected signal at a sixth timing, the fifth timing being immediately before the second pulse rise transition and the sixth timing immediately after the second pulse rise transition; and (4) a fourth variation based on an absolute value of the subtraction of a voltage value of a detected signal at a seventh timing from a voltage value of a detected signal at an eighth timing, the seventh timing being immediately before the second pulse fall transition and the eighth timing being immediately after the second pulse fall transition, and
(c) noise signals that have different frequencies are offset by operation of the detection section.

18. An electronic unit including a display and a control section controlling operation using the display, the display comprising:
  display elements;
  drive electrodes;
  touch detection electrodes each forming an electrostatic capacitance with corresponding one of the drive electrodes;
  a drive section that applies an AC drive signal to the drive electrodes during each of a plurality of touch detection periods, the AC drive signal involving multiple transitions to generate one or more transition timing pairs; and
  a detection section that samples respective detected signals output from each of the touch detection electrodes at timings before and after each transition of the AC drive signal and that performs touch detection using a sum of variations of a result of the sampling in each transition,
wherein,
(a) the AC drive signal includes, over the plurality of the touch detection periods, at least (1) a first transition timing pair that has a first transition interval and that includes a first pulse rise transition, the first transition interval, then a first pulse fall transition; and (2) a second transition timing pair that has a second transition interval different from the first transition interval and that includes a second pulse rise transition, the second transition interval, then a second pulse fall transition,
(b) the sum of variations is determined by adding (1) a first variation based on an absolute value of the subtraction of a voltage value of the detected signal at a first timing from a voltage value of the detected signal at a second timing, the first timing being immediately before the first pulse rise transition and the second timing being immediately after the first pulse rise transition; (2) a second variation based on an absolute value of the subtraction a voltage value of a detected signal at a third timing from a voltage value of a detected signal at a fourth timing, the third timing being immediately before the first pulse fall transition and the fourth timing being immediately after the first pulse fall transition; (3) a third variation based on an absolute value of the subtraction of a voltage value of a detected signal at a fifth timing from a voltage value of a detected signal at a sixth timing, the fifth timing being immediately before the second pulse rise transition and the sixth timing immediately after the second pulse rise transition; and (4) a fourth variation based on an absolute value of the subtraction of a voltage value of a detected signal at a seventh timing from a voltage value of a detected signal at an eighth timing, the seventh timing being immediately before the second pulse fall transition and the eighth timing being immediately after the second pulse fall transition, and
(c) noise signals that have different frequencies are offset by operation of the detection section.

* * * * *